US011089905B2

(12) United States Patent
Gauger et al.

(10) Patent No.: US 11,089,905 B2
(45) Date of Patent: Aug. 17, 2021

(54) AUTOMATED BUN HANDLING SYSTEM

(71) Applicant: A. J. ANTUNES & CO., Carol Stream, IL (US)

(72) Inventors: Steve Gauger, Crystal Lake, IL (US); Chad Elliott, Frankfort, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 130 days.

(21) Appl. No.: 16/557,758

(22) Filed: Aug. 30, 2019

(65) Prior Publication Data

US 2020/0121128 A1 Apr. 23, 2020

Related U.S. Application Data

(60) Provisional application No. 62/724,663, filed on Aug. 30, 2018.

(51) Int. Cl.
*A47J 37/06* (2006.01)
*A47J 37/08* (2006.01)
*A47J 37/04* (2006.01)

(52) U.S. Cl.
CPC ......... *A47J 37/0857* (2013.01); *A47J 37/045* (2013.01); *A47J 37/0864* (2013.01); *A47J 37/0871* (2013.01)

(58) Field of Classification Search
CPC . B26D 3/30; A47J 47/12; A47J 37/044; A47J 37/045; A47J 37/0857; A47J 37/0864; A47J 37/0871; A47J 39/00; A47F 1/125; G06Q 30/06; G06Q 50/12; A21C 15/00; A21C 15/002; A21C 15/007; A21C 15/04; G07F 11/28; B65G 2201/0202

USPC .............. 99/339, 385, 386, 387, 389, 443 R, 99/443 C, 450.4, 450.5
See application file for complete search history.

(56) References Cited

U.S. PATENT DOCUMENTS

| 2,271,937 | A | | 2/1942 | Engels |
| 2,462,021 | A | | 2/1949 | Harker |
| 3,116,822 | A | | 7/1964 | Carus |
| 3,152,535 | A | | 10/1964 | Pollak, Jr. et al. |
| 4,129,207 | A | | 12/1978 | Cupp |
| 5,562,183 | A | * | 10/1996 | Naramura ................ A21C 9/04 |
| | | | | 99/450.4 |
| 6,619,503 | B2 | | 9/2003 | Leykin et al. |
| 9,788,687 | B2 | | 10/2017 | Frehn et al. |
| 10,086,525 | B2 | | 10/2018 | Engel-Hall et al. |

(Continued)

*Primary Examiner* — Hung D Nguyen
(74) *Attorney, Agent, or Firm* — Law Offices Of Steven W. Weinrieb

(57) ABSTRACT

An automated bun feeding and toasting system is disclosed wherein the system is to be utilized in restaurants, particularly fast-food restaurants, in order to quickly and accurately prepare food products, such as, for example, conventional hamburger sandwiches which require two buns, or Big Mac® sandwiches which require three buns, in accordance with specific patron orders. The system comprises a plurality of bun storage tubes, discharge mechanisms for discharging bun segment into a bun separator, a chute conveyor, a bun rotator, and at least one toaster appliance whereupon completion of a toasting operation, the bun segments are picked up and conveyed downstream toward a food or sandwich preparation station. All operations are automated and are under the control of a master control unit such as, for example, a programmable logic controller (PLC).

22 Claims, 16 Drawing Sheets

(56) References Cited

U.S. PATENT DOCUMENTS

| | | |
|---|---|---|
| 2004/0208961 A1 | 10/2004 | Reckert et al. |
| 2016/0183728 A1* | 6/2016 | Moma-M04-Us1-App-Ads ......... A21C 15/002 99/385 |
| 2019/0208793 A1 | 7/2019 | Bauer et al. |
| 2019/0208927 A1 | 7/2019 | Veltrop et al. |

* cited by examiner

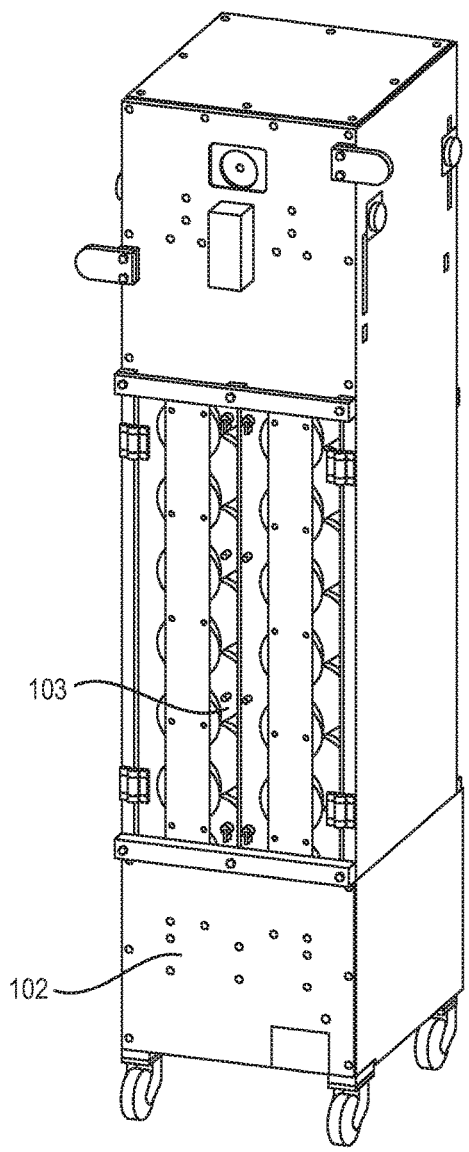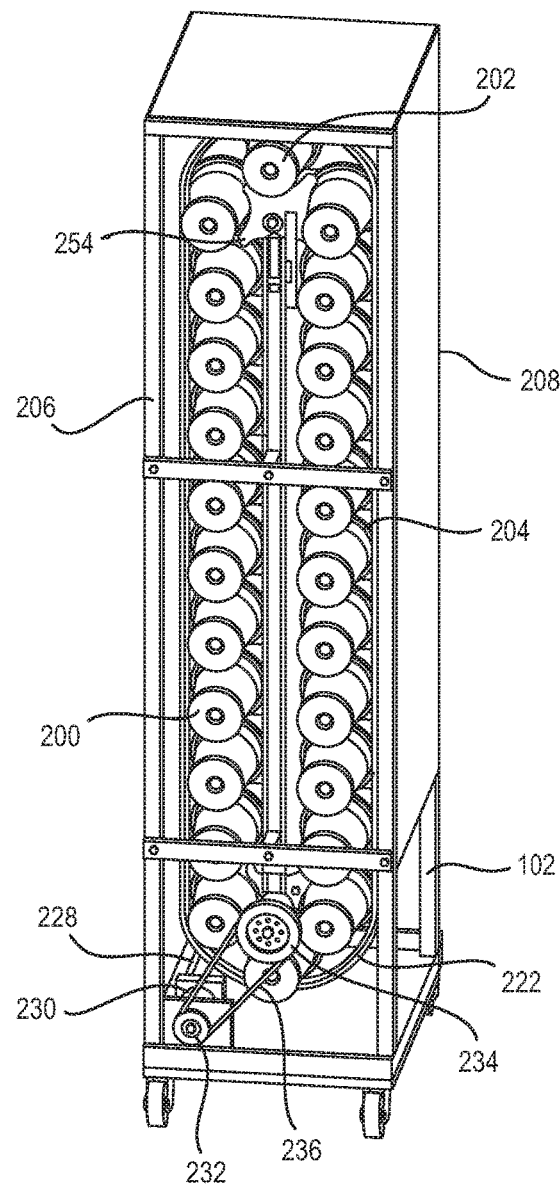
FIG. 2
FIG. 3 ued States Patent
US 11,089,905 B2

AUTOMATED BUN HANDLING SYSTEM

CROSS-REFERENCE TO RELATED PATENT APPLICATION

This patent application is a non-provisional conversion of U.S. Provisional Patent Application No. 62/724,663 which was filed on Aug. 30, 2018, the priority benefits of which are hereby claimed.

FIELD OF THE INVENTION

The present invention relates generally to food service equipment, and more particularly to a new and improved automated bun handling and toasting system which is to be utilized in restaurants, particularly fast-food restaurants, in order to quickly and accurately prepare food products, such as, for example, conventional hamburger sandwiches which require two buns, or Big Mac® sandwiches which require three buns, in accordance with specific patron orders.

BACKGROUND OF THE INVENTION

Conventionally, when preparing specific food orders, particularly in a fast-food restaurant, food preparation personnel must infeed the food products, to be cooked, toasted, or the like, in an individual or one-by-one manner into the particular cooking or toasting appliance, and in a similar manner, must likewise remove the food products in an individual or one-by-one manner from the particular cooking or toasting appliance. Obviously, such food preparation, cooking, or toasting procedures are very inefficient, time consuming, and labor intensive, particularly for fast-food restaurants wherein quick or rapid cooking or toasting food preparation times are required or desirable in order to produce the cooked or toasted food products within relatively short service times which effectively define one of the more important and attractive features or characteristics of fast-food establishments.

A need therefore exists in the art for a new and improved piece of food service equipment. An additional need exists in the art for a new and improved piece of food service equipment which is adapted to prepare, cook, or toast specific food items. A still additional need exists in the art for a new and improved piece of food service equipment which is adapted to prepare, cook, or toast buns for hamburgers or Big Macs®. A yet additional need exists in the art for a new and improved piece of food service equipment which can be utilized in various different food establishments. A still yet additional need exists in the art for a new and improved piece of food service equipment which can be utilized in various different food establishments, such as, for example, fast food restaurants. A further need exists in the art for a new and improved piece of food service equipment which can be utilized in various different food establishments, such as, for example, fast food restaurants, wherein quick turn-around time for cooking or preparing food item orders is a highly sought-after feature or characteristic. A still further need exists in the art for a new and piece of improved food service equipment which can be utilized in various different food establishments, such as, for example, fast food restaurants, wherein the equipment is very compact yet efficient in providing the cooked food products. A yet further need exists in the art for a new and improved piece of food service equipment which can be utilized in various different food establishments, such as, for example, fast food restaurants, wherein the appliance is very compact, efficient in providing the cooked food products, and can be operated by means of a minimum number of food preparation personnel. A still yet further need exists in the art for a new and improved piece of food service equipment which can be utilized in various different food establishments, such as, for example, fast food restaurants, wherein the equipment is very compact, efficient in providing the cooked food products, can be easily operated by means of a minimum number of food preparation personnel, and can be utilized to prepare, cook, or toast numerous food items substantially as opposed to being constrained to process the food items singly, or in a one-by-one fashion. A yet still further need exists in the art for a new and improved piece of food service equipment which can be utilized in various different food establishments, such as, for example, fast food restaurants, wherein numerous food items can effectively be pre-loaded into the equipment, particularly during lull or relatively slow business hours or times, such that the plurality of food items will then be substantially immediately available for order processing as orders are inputted into the system for patrons at a "point-of-sale" (POS) location as opposed to being constrained to process the food items singly, or in a one-by-one fashion.

OVERALL OBJECTIVES OF THE PRESENT INVENTION

A primary objective of the present invention is to provide a new and improved piece of food service equipment. An additional objective of the present invention is to provide a new and improved piece of food service equipment which is adapted to prepare, cook, or toast specific food items. A still additional objective of the present invention is to provide a new and improved piece of food service equipment which is adapted to prepare, cook, or toast buns for hamburgers or Big Macs®. A yet additional objective of the present invention is to provide a new and improved piece of food service equipment which can be utilized in various different food establishments. A still yet additional objective of the present invention is to provide a new and improved piece of food service equipment which can be utilized in various different food establishments, such as, for example, fast food restaurants. A further objective of the present invention is to provide a new and improved piece of food service equipment which can be utilized in various different food establishments, such as, for example, fast food restaurants, wherein quick turnaround time for cooking or preparing food item orders is a highly sought-after feature or characteristic. A still further objective of the present invention is to provide a new and piece of improved food, service equipment which can be utilized in various different food establishments, such as, for example, fast food restaurants, wherein the equipment is very compact yet efficient in providing the cooked food products. A yet further objective of the present invention is to provide a new and improved piece of food service equipment which can be utilized in various different food establishments, such as, for example, fast food restaurants, wherein the appliance is very compact, efficient in providing the cooked food products, and can be operated by means of a mini-mum number of food preparation personnel. A still yet further objective of the present invention is to provide a new and improved piece of food service equipment which can be utilized in various different food establishments, such as, for example, fast food restaurants, wherein the equipment is very compact, efficient in providing the cooked food products, can be easily operated by means of a minimum number of food preparation personnel, and can be utilized to prepare, cook, or toast numerous food items substantially as opposed to being constrained to process the food items singly, or in a one-by-one fashion. A yet still further objective of the present invention is to provide a new and improved piece of food service equipment which can be utilized in various different food establishments, such as, for example, fast food restaurants, wherein numerous food items can effectively be pre-loaded into the equipment, particularly during lull or relatively slow business hours or times, such that the plurality of food items will then be substantially immediately available for order processing as orders are inputted into the system for patrons at a "point-of-sale" (POS) location as opposed to being constrained to process the food items singly, or in a one-by-one fashion.

SUMMARY OF THE INVENTION

The foregoing and other objectives are achieved in accordance with the teachings and principles of the present invention through the provision of a new and improved bun handling system, in conjunction with bun toasting equipment, for preparing sandwich buns or similar food products wherein, in lieu of food preparation personnel having to infeed the food products, to be cooked, toasted, or the like, in an individual or one-by-one manner, the bun handling system of the present invention comprises a system that enables multiple food products to be inserted into the bun handling system in a pre-loaded manner. In addition, the food equipment comprises sub-systems which perform various necessary functions in order to efficiently and accurately produce numerous patrons' orders. More particularly, the food equipment system of the present invention enables a particular bun, or a plurality of buns, to be selected from a bun storage system, to be properly oriented, to be conveyed to a cooking appliance, such as, for example, a toaster, to be toasted for a predetermined period of time, to be discharged from the toaster, and to ultimately be conveyed to one or more downstream food preparation stations at which, for example, the buns will be used as part of a sandwich, will have predetermined condiments deposited thereon, and will be packaged for presentation to the patron who ordered the particular food item.

More particularly, the present invention comprises a bun handling system which comprises a plurality of bun storage tubes are mounted. Each one of the plurality of bun storage tubes contains a plurality of buns stored within the particular bun storage tube in a horizontally stacked or serial array. The plurality of bun storage tubes are disposed upon a plurality of vertically oriented endless conveyors or carousels wherein the plurality of vertically oriented endless conveyors are effectively disposed within a substantially vertically oriented elliptical array such that the individual bun storage tubes can move along the locus defining the substantially vertically oriented elliptical array of conveyors or carousels as the conveyors or carousels are rotated. In this manner, the plurality of bun storage tubes are, in turn, disposed within a substantially vertically oriented elliptical array such that when one of the plurality of bun storage tubes is disposed at the uppermost central position of the substantially vertically oriented elliptical array, the end cap of the bun storage tube is removed, and a pusher block mechanism or system is utilized so as to effectively interact with the particular bun storage tube and thereby push the plurality of buns, disposed within the particular bun storage tube, a predeterminedly controlled amount or distance so as to discharge the leading one of the buns from bun storage tube. In turn, the discharged buns will enter predetermined sections of a bun separator whereby the buns will be conveyed toward a bun chute which will, in turn, deposit the buns into bun rotators such that the buns are properly oriented with respect to toaster appliances such that the buns can be toasted upon one or both sides thereof. Upon the conclusion of the toaster operations, the buns are automatically discharged from the toaster appliances onto conveyors whereby the toasted buns will be automatically picked up and conveyed downstream toward a food or sandwich preparation station and ultimately a food or sandwich package wrapping station.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 2 is a front, right side, top perspective view of one of the cabinets housing one of the vertically oriented carousel or endless conveyor mechanisms of the new and improved automated bun feeding system as disclosed within FIGS. 1 and 1a;

FIG. 3 is a view similar to that of FIG. 2 wherein the front doors and/or covers of the cabinet have been removed so as to more clearly disclose the vertically oriented carousel or endless conveyor mechanism of the new and improved automated bun feeding system;

DETAILED DESCRIPTION OF THE PREFERRED EMBODIMENT

Figure 1:
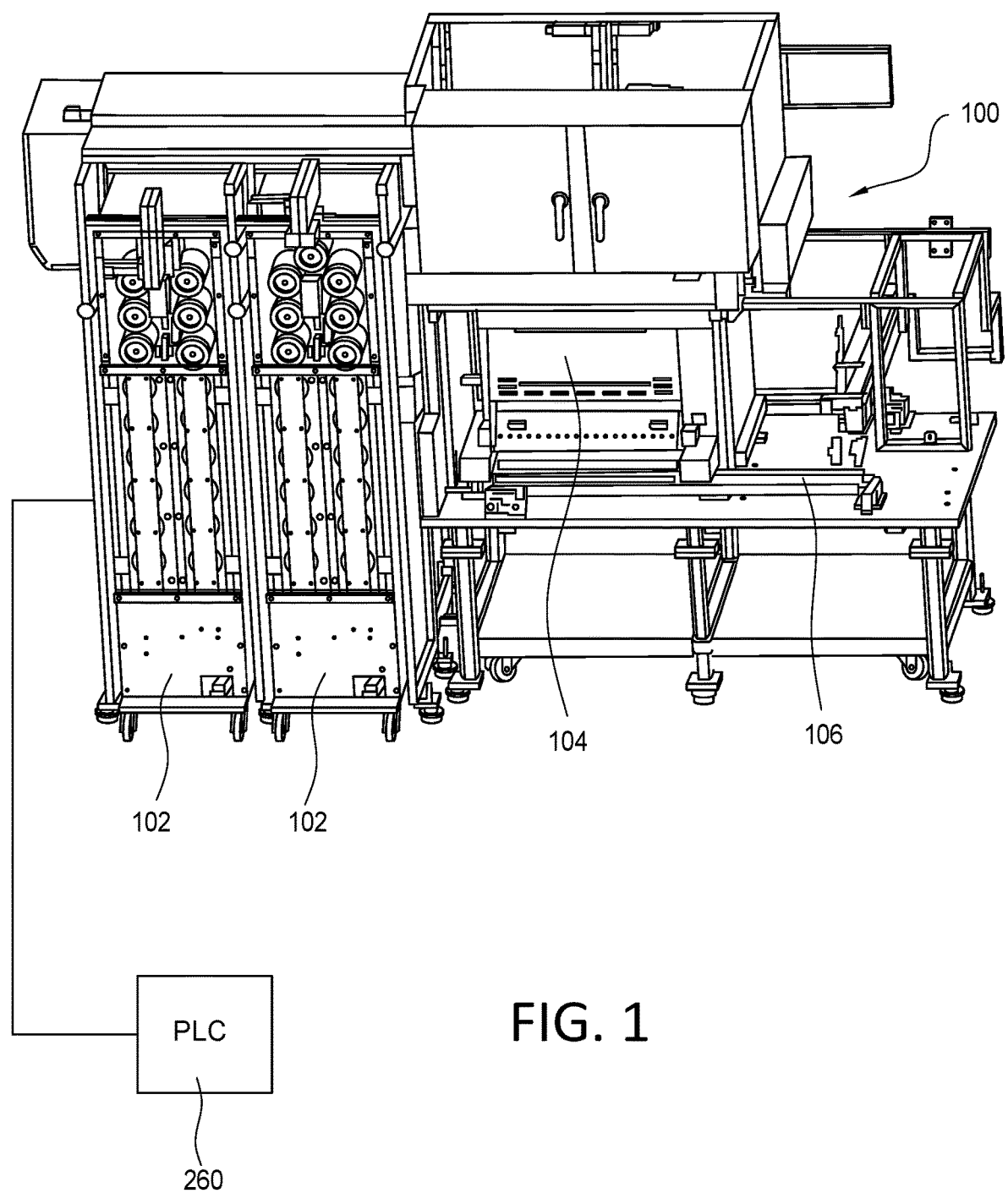
FIG. 1 is a schematic perspective view of a new and improved automated bun feeding and toasting system as constructed in accordance with the principles and teachings of the present invention.

Referring now to the drawings, and more particularly to FIG. 1 thereof, the new and improved automated bun feeding and toasting system, as constructed in accordance with the principles and teachings of the present invention, is disclosed and is generally indicated by the reference character 100. More particularly, it is seen that the new and improved automated bun feeding and toasting system 100 is seen to comprise a pair of bun storage cabinets 102 for housing a multitude or a plurality of bun storage tubes, as will be described more fully hereinafter, a toaster appliance 104, and a conveyor mechanism 106 for conveying food buns to a bun pickup station at which the buns will be processed further in connection with the fabrication of the sandwich order, packaging of the completed food item, and the like. Of course, it is to be noted that the system 100 may comprises more than two bun storage cabinets 102 as may be deemed desirable or required in connection with the efficient operation of the particular food establishment within which the system 100 is being utilized.

Figure 1A:
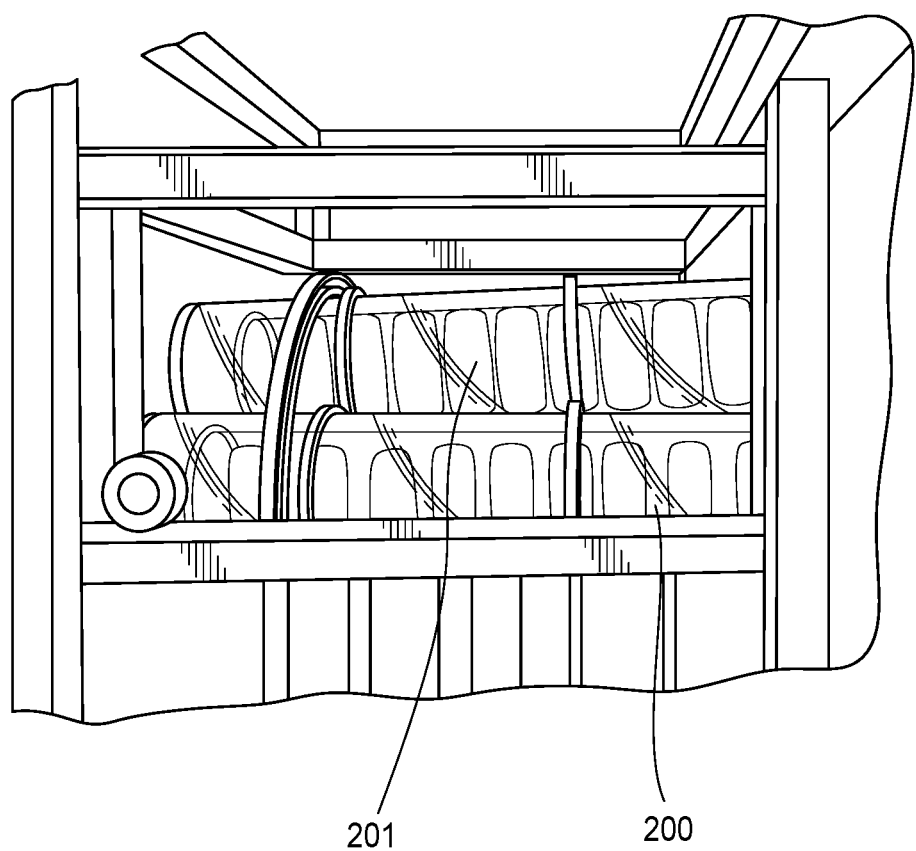
FIG. 1a is a side elevational view showing a plurality of bun storage tubes disposed within the vertically oriented carousel or endless conveyor mechanism of the apparatus of FIG. 1 wherein a multitude or plurality of buns are serially arranged within each bun storage tube.
Figure 4:
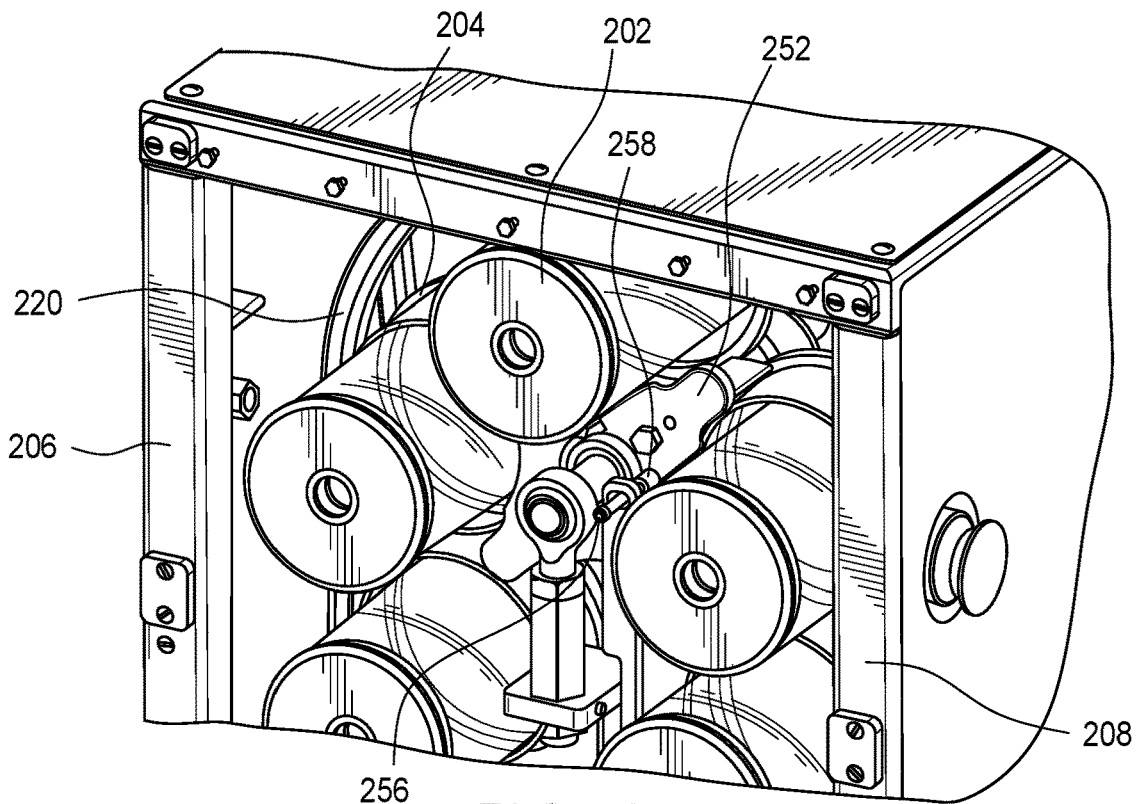
FIG. 4 is an enlarged detailed view of FIG. 3 showing one of the star wheel components of the carousel or endless conveyor system, the proximity sensor, and its associated flag for initially calibrating the carousel or endless conveyor system.
Figure 5:
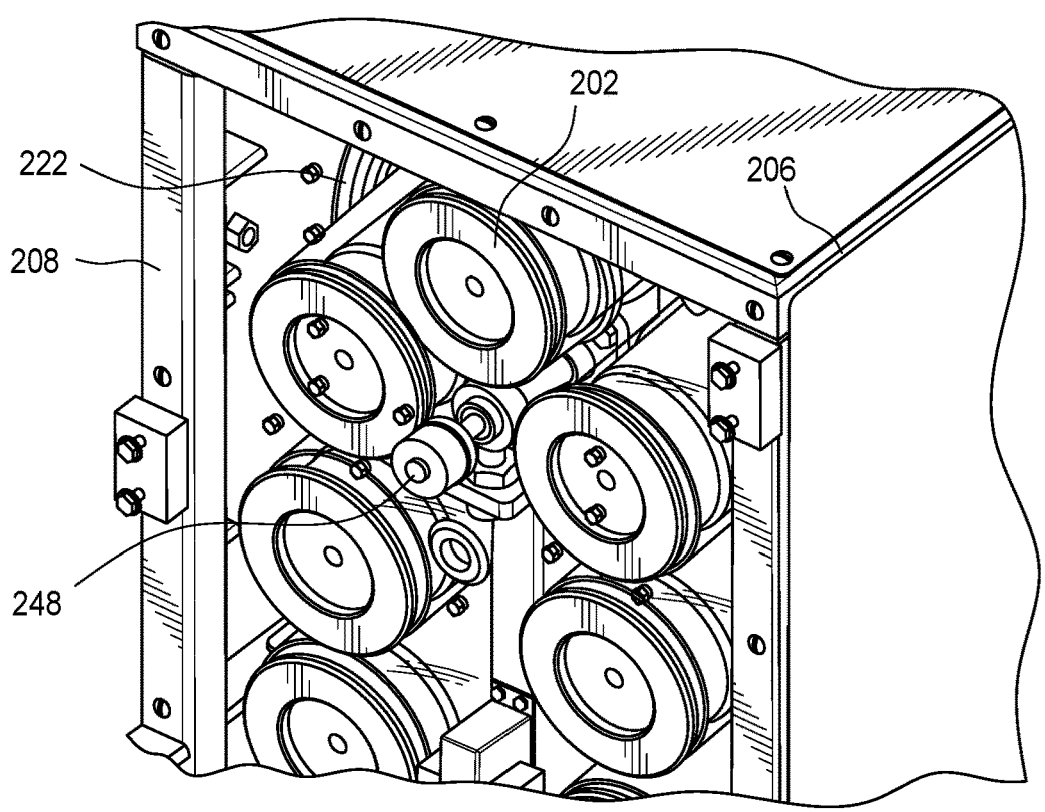
FIG. 5 is an enlarged detailed rear view of the carousel or endless conveyor system disclosing the rotary encoder utilized with the timing belt of the carousel or endless conveyor system.

With reference now being made to FIGS. 2-6, it is seen that each one of the pair of bun storage cabinets 102 contains or houses a set of bun storage tubes 200 which is defined by means of a multitude or plurality of bun storage tubes 200 which are arranged within a substantially vertical, elliptical array effectively forming an endless conveyor or carousel system, which will be described more fully hereinafter, by means of which any particular one of the multitude or plurality of bun storage tubes 200 may be moved from any one of its positions, as disclosed within FIGS. 3-6, to the twelve o'clock or top dead center position, which comprises the bun dispensing position, as can be clearly appreciated from FIGS. 3-6 and which has been denoted by the reference character 202. It is further seen that each bun storage tube 200, comprising each set of bun storage tubes disposed within each one of the pair of bun storage cabinets 102, comprises an elongated, horizontally disposed tubular structure within which a plurality of buns 201 are disposed, as best seen in FIG. 1a, and may comprise, for example, conventional buns utilized in making hamburgers or Big Macs. It is to be appreciated that the multitude or plurality of bun storage tubes 200 are adapted to house or contain a variety of buns, such as, for example, a heel or crown type bun which will be used to form a conventional sandwich or hamburger, and/or an intermediate or club bun which can be used, for example, when making a Big Mac® type hamburger sandwich which requires three buns to comprise such type of sandwich. In addition, it is also noted that the multitude or plurality of bun storage tubes 200 can house or contain a diverse variety of buns, such as, for example, whole wheat buns, whole grain buns, multi-grain buns, sour dough buns, and the like, which will be pre-selected by means of the food patron when the food patron originally places his or her order at the "point of sale" (POS) location within the eatery.

It is further noted that the purpose of having or utilizing a pair of bun storage cabinets 102, effectively disposed in a side-by-side manner within the overall system or apparatus 100, is to enable the overall apparatus or system 100 to simultaneously perform two different operations which are necessary to the overall efficient operation of the apparatus or system 100. For example, while the endless conveyor system, operatively associated with a first set of bun storage tubes 200 disposed within a first one of the pair of bun storage cabinets 102, is actuated such that the multitude or plurality of bun storage tubes 200, disposed within the first one of the pair of bun storage cabinets 102, is moved such that a particular one of the bun storage tubes 200 is moved to, or disposed at, the dispensing position or location of the bun storage cabinet 102, which, as previously noted, is effectively defined as being at the twelve o'clock or top dead center position, the endless conveyor system, operatively associated with the second set of bun storage tubes 200 disposed within the second one of the pair of bun storage cabinets 102, can be actuated such that the multitude or plurality of bun storage tubes 200 disposed within the second one of the pair of bun storage cabinets 102 can likewise be moved to its twelve o'clock or top dead center dispensing position or location. In this manner, significant operational time is saved as opposed to what would otherwise be required if only a single storage cabinet 102, containing a multitude or plurality of bun storage tubes 200, was employed. More particularly, for example, in such case where only a single storage cabinet 102, containing a multitude or plurality of bun storage tubes 200, was employed, after a particular one of the multitude or plurality of bun storage tubes 200 was disposed at the dispensing position or location such that a first bun could be discharged or dispensed therefrom, then the endless conveyor system, operatively associated with that single set of a multitude or plurality of bun storage tubes 200, would have to be activated so as to now move the same set of the multitude or plurality of bun storage tubes 200 so as to effectively position a second one of the multitude or plurality of bun storage tubes 200 at the dispensing position or location so as to in fact permit a second bun to be discharged from the second one of the multitude or plurality of bun storage tubes 200.

With reference continuing to be made to FIGS. 3-8, the disposition of the multitude or plurality of bun storage tubes 200 within the vertically oriented conveyor system, as well as the operation of the vertically oriented conveyor system, will now be described. As can best be seen from FIGS. 3,4, and 6-8, each one of the multitude or plurality of bun storage tubes 200 is provided with a pair of axially spaced, fore and aft, supporting rings 204 annularly encircling the outer peripheral surface portion of each one of the multitude or plurality of bun storage tubes 200. Accordingly, it can be appreciated that the multitude or plurality of bun storage tubes 200 are effectively disposed in contact with, or are engaged with, each other as a result of each pair of axially spaced, fore and aft, supporting rings 204 of a first one of the multitude or plurality of bun storage tubes 200 being in contact with, or engaged with, the pair of axially spaced, fore and aft, supporting rings 204 of second and third ones of the multitude or plurality of bun storage tubes 200 disposed upon opposite sides of the first one of the multitude or plurality of bun storage tubes 200, as considered in the counterclockwise movement direction of all of the multitude or plurality of bun storage tubes 200. It is to be noted that while the multitude or plurality of bun storage tubes has been generally indicated by the reference character 200, in reality, the actual bun storage tubes 200 are removably disposed within outer tubular structures which are fixedly mounted within the framework of the apparatus and upon which the supporting rings 204 are affixed.

Figure 7:
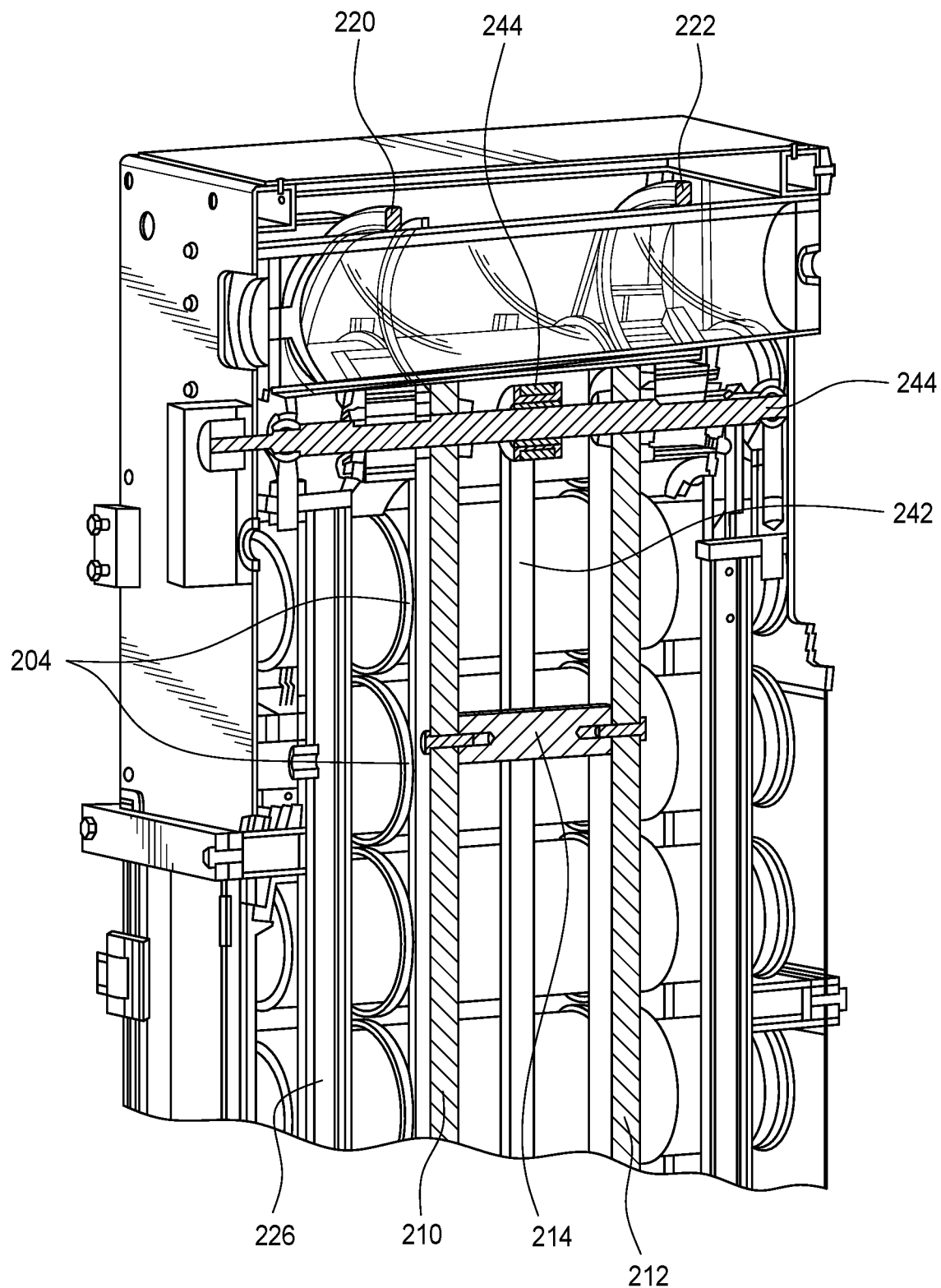
FIG. 7 is a cross-sectional, perspective view of the carousel or endless conveyor system disclosing part of the framework within which the carousel or endless conveyor system is disposed.
Figure 8:
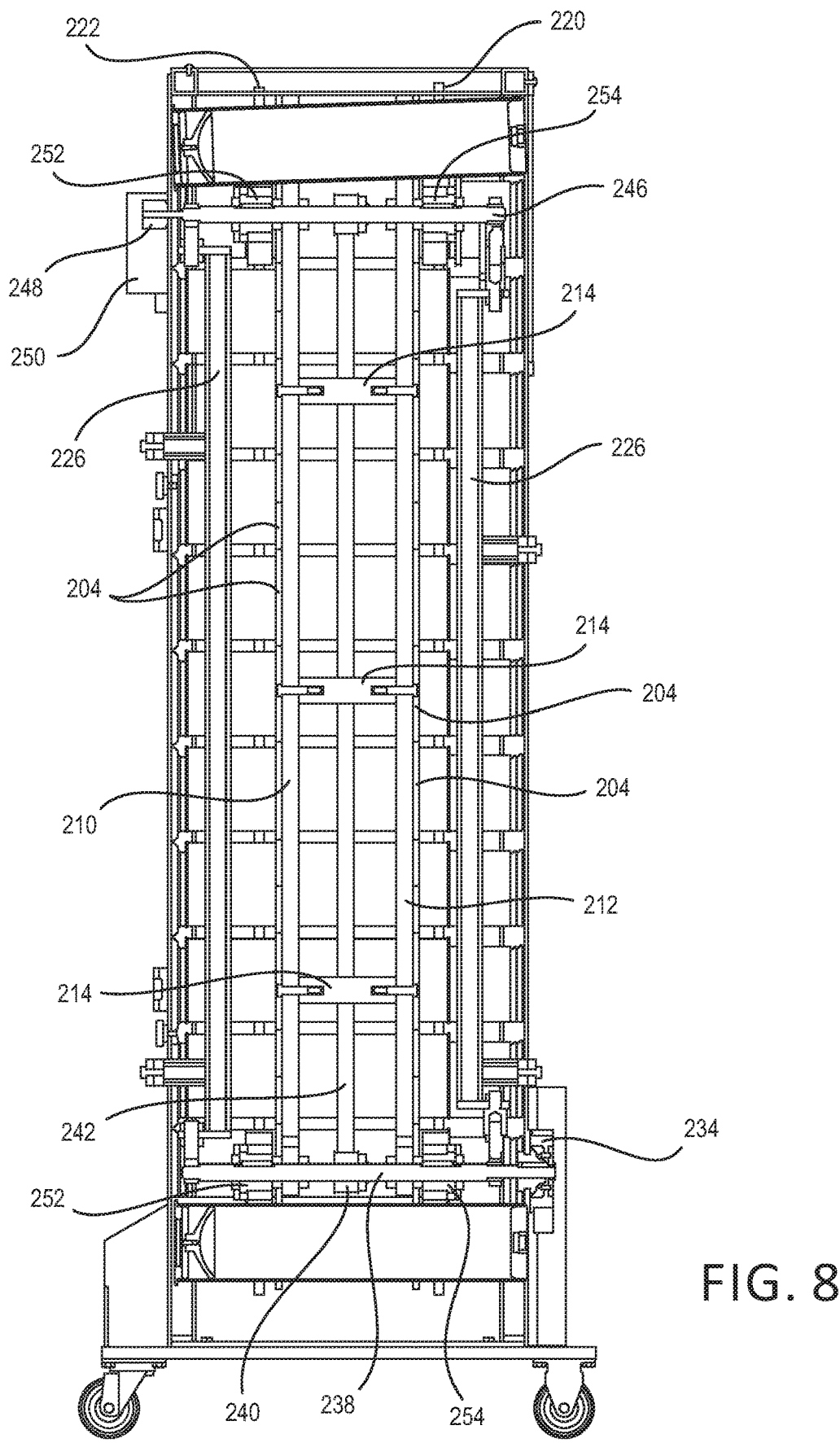
FIG. 8 is a side-elevational, cross-sectional view similar to that of FIG. 7 disclosing part of the framework within which the carousel or endless conveyor system is disposed.
Figure 9:
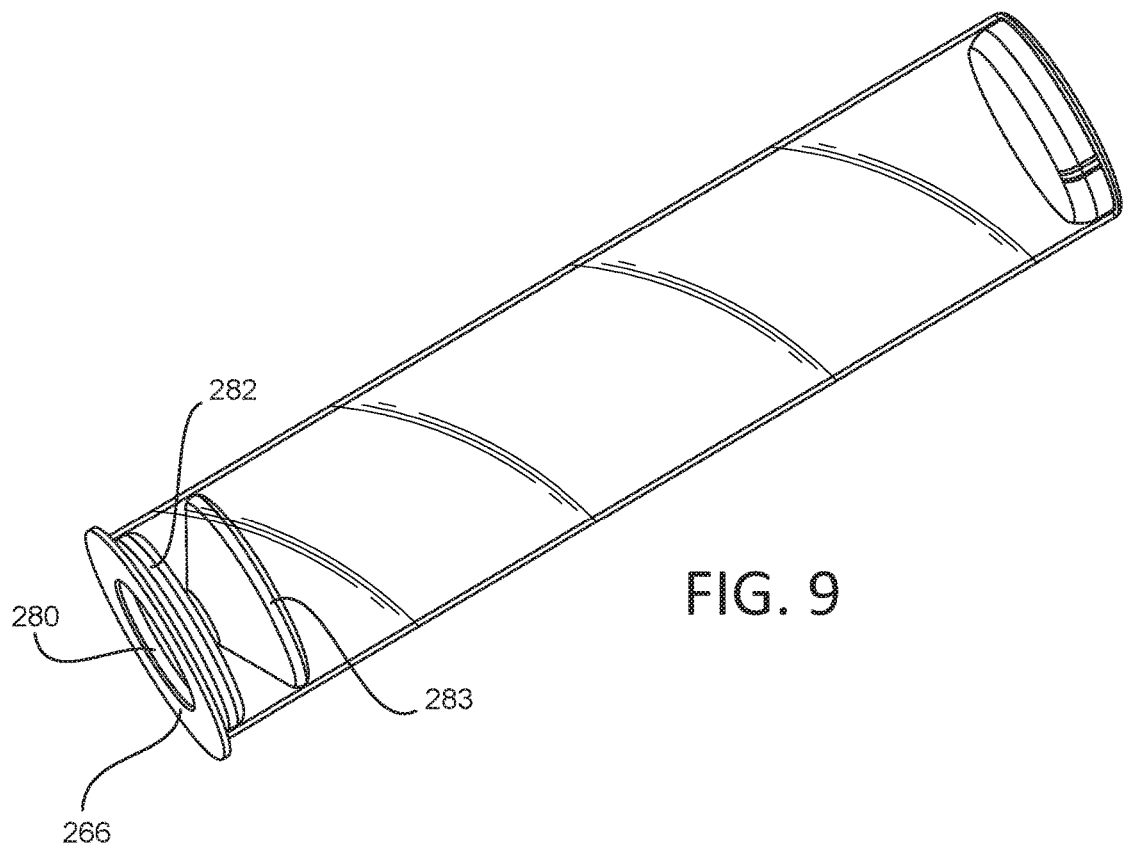
FIG. 9 is an external perspective view of one of the bun storage tubes.
Figure 10:
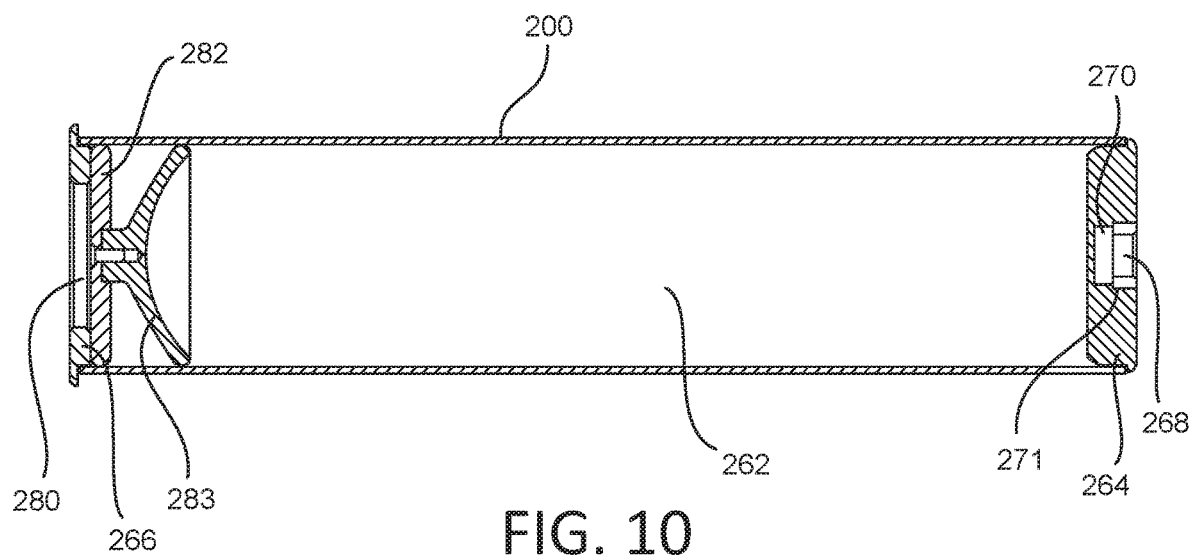
FIG. 10 is a longitudinal cross-sectional view of the bun storage tube disclosed within FIG. 9.

This structure permits the actual interior bun storage tubes 202 to be removed from the external tubular structures so that individual bun storage tubes 202 may be refilled with buns 201 when a particular supply of buns 201 within a particular bun storage tube 202 has been depleted, or alternatively, the depleted bun storage tube 202 can be simply removed from the system and replaced by means of a new bun storage tube 202 containing a complete, fresh supply of buns 201. Reverting back to the disposition of the bun storage tubes 200 within the carousel or endless conveyor, the only exception to this relative disposition defined between the multitude or plurality of bun storage tubes 200 being disposed in contact with, or engaged with, its oppositely disposed adjacent ones of the multitude or plurality of bun storage tubes 200 is when a particular one of the multitude or plurality of bun storage tubes 200 is disposed at the twelve o'clock or top dead center bun dispensing position, as will be explained shortly. Furthermore, it is seen that the multitude or plurality of bun storage tubes 200 are additionally, in effect, confined both axially and transversely within a framework formed within each bun storage cabinet 102. More particularly, as can best be appreciated from FIGS. 3 and 6-8, each bun storage cabinet 102 comprises left and right side walls 206, 208, as viewed, for example, within FIG. 3, and internally within each bun storage cabinet 102, and adjacent to each one of the side walls 206,208, there is provided a pair of axially spaced, vertically extending frame members 210,212, as best seen in FIGS. 6-8, which are fixedly connected together by means of a plurality of horizontally oriented, vertically spaced connectors 214.

Figure 6:
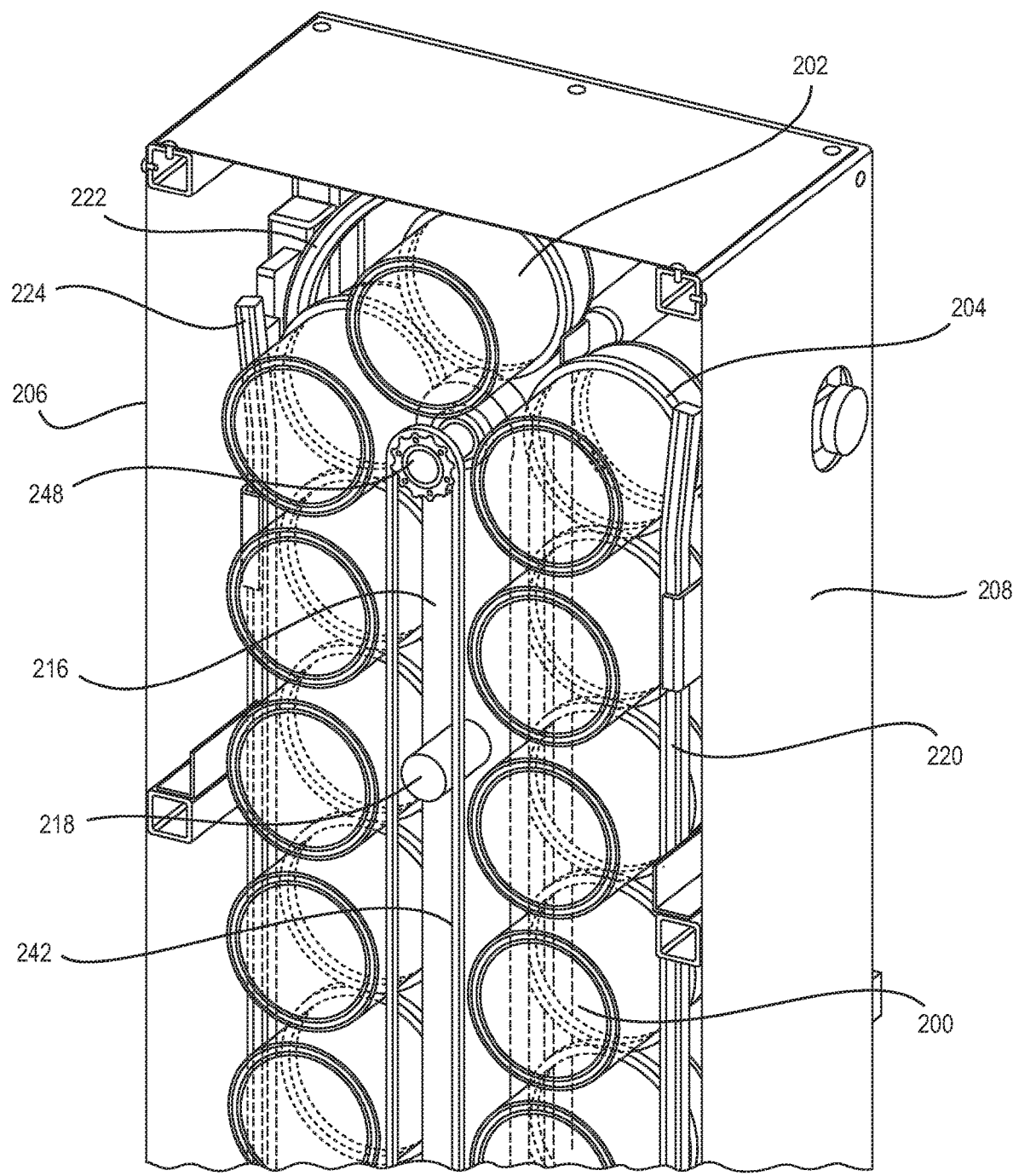
FIG. 6 is a rear perspective view of the carousel or endless conveyor system showing the rotary encoder, the timing belt, and the annular rings upon which the external tubes of the bun storage tubes are disposed in contact with each other so as to collectively be supported within the carousel or endless conveyor system.

In a similar manner, as can best be seen or appreciated from FIG. 6, a pair of axially spaced, vertically extending frame members, only one of which is shown at 216, are interposed between the oppositely disposed vertically oriented serial arrays of bun storage tubes 200, so as to effectively be disposed along the centerline of each bun storage cabinet 102, and are connected together by means of a plurality of horizontally extending, vertically spaced connectors 218, only one of which is shown. In addition, it is also seen that in order to, in effect, complete the framework within which the plurality or multitude of bun storage tubes 200 will be disposed, confined, and moved along their substantially elliptical conveyor path, a pair of axially spaced arcuate frame members 220,222, as can best be seen in FIGS. 4-8, are adapted to engage fore and aft external peripheral surface portions of the three uppermost and three lowermost bun storage tubes 200 as can also be seen and appreciated from FIG. 3. The arcuate frame members 220, 222 are fixedly connected to additional vertically oriented frame members 224,226 which can also be seen in FIGS. 6-8. Still further, as can be best appreciated from FIG. 8, the annular rings 204, surrounding each one of the multitude or plurality of bun storage tubes 200, are engaged with axially forward and aft edge portions of the axially spaced, vertically extending frame members 210,212. Accordingly, it can be readily appreciated that the plurality or multitude of bun storage tubes 200 are effectively locked in position, or at least confined or restrained with respect to any substantial axial or transverse movements, with respect to the framework defined within each bun storage cabinet 102 except for the movements of the plurality or multitude of bun storage tubes 200 along the substantially elliptically defined conveyor path effectively formed within each one of the bun storage cabinets 102 by the frame members 210,212,220, 222.7

Continuing further, and with reference being made to FIGS. 3-6 and 8, the drive system for the substantially elliptical endless conveyor system will now be described. As illustrated within FIG. 3, a motor drive 228 is disposed within the bottom portion of each bun storage cabinet 102 and is operatively connected to a gearbox 230 wherein the output shaft of the gearbox 230 is provided with a first small pulley 232. The small pulley 232 is operatively connected to a large pulley 234 by means of a pulley belt 236, and as can best be seen in FIG. 8, the large pulley 234 is mounted upon one end of a first lower rotary shaft 238. A first sprocket shaft 240 is fixedly mounted upon a central portion of rotary shaft 238 and has one end of an endless timing belt 242 disposed therearound. The endless timing belt 242 extends vertically upwardly such that an upper end portion of the endless timing belt 242 is likewise disposed around a second sprocket shaft 244 which is fixedly mounted upon a central portion of a second upper rotary shaft 246 which is operatively connected at one end thereof to a rotary encoder 248 which is enclosed within a covered box 250. As can best be seen from FIGS. 3,4, and 8, a pair of axially spaced star wheels 252,254 are fixedly mounted upon both the first lower rotary shaft 238 and the second upper rotary shaft 246, and the radially outwardly projecting fingers of the star wheels 252,254 are adapted to be inserted between adjacent bun storage tubes 200 so as to effectively separate the bun storage tube 200 that is approaching the uppermost or top dead center position from its next adjacent or trailing bun storage tube 200, as considered in the counterclockwise rotational direction of the apparatus as disclosed within FIG. 4, and thereby move the separated bun storage tube 200 into the uppermost or top dead center position in preparation for the discharge of a bun from such bun storage tube 200 which is now designated bun storage tube 202. A proximity sensor 256 is fixedly mounted within the framework of the bun storage cabinet 102 at a position adjacent to the uppermost or top dead center bun dispensing position as occupied by means of the uppermost bun storage tube 202, and a flag 258 is fixedly mounted upon the star wheel 252 as can best be seen in 3. When the flag 258 is properly aligned with the proximity sensor 256, then it is assured that the uppermost bun storage tube 202 is in fact precisely located at the uppermost or top dead center bun dispensing position, as a result of which the rotary encoder 248 can then precisely cause the movement of any one of the bun storage tubes 200 to the top, dead center or bun discharge position under the control of a suitable master controller, such as, for example, a programmable logic controller (PLC) 260 which, of course, is directly linked to, or otherwise in communication with, the "point of sale" (POS) location at which a patron inputs his or her food item order whereby processing of the patron's food item order can then be implemented. In fact, the master controller or programmable logic controller (PLC) 260 controls all movements of all components within the overall system 100 by means of signals sent to the movable components in response to signals received, for example, from various sensors effectively telling the master controller or programmable logic controller (PLC) 260 that a previous operation has been completed and that the next operation needs to be implemented.

With reference then being made to FIGS. 9-13, a detailed description of one of the multitude or plurality of bun storage tubes 200 disposed within the bun storage cabinet 102, the opening of the bun storage tube 200 as a result of the removal of its end cap, and the use of a stepper motor to successively incrementally dispense the lead buns housed within the bun storage tube 200, will now be described. More particularly, it is seen that each bun storage tube 200 comprises a bun storage tube housing 262, within which a plurality of buns, not shown, are to be stored, a front end cap 264 removably disposed upon the front or discharge end of the bun storage tube housing 262, and an annular rear end cap 266 fixedly mounted upon the rear end of the bun storage tube housing 262. The front end cap 264 is provided with an annular bushing 268 which is fixedly mounted within the front end cap 264, and a counterbored region 270 is defined behind the annular bushing 268. As can be seen or appreciated from FIG. 9, the counterbored region 270 has a diametrical extent which is somewhat less than the diametrical extent of the annular bushing 268, but since it comprises a counterbored region, it effectively defines an open space behind the annular bushing 264. In addition, as can best be seen in FIG. 11, a chuck or gripper mechanism 272, comprising, for example, three or four gripper fingers 274 which are movable between radially inner and radially outer positions as a result of pneumatic fluid being alternatively provided to two different fluid ports, not shown, defined within the chuck or gripper mechanism 272, is movable between forward and aft, or left and right, positions, as viewed within FIG. 11, by means of a gripper air cylinder mechanism 276 which is likewise pneumatically actuated.

Accordingly, when it is desired to remove the front end cap 264 of a particular bun storage tube 200, the chuck or gripper mechanism 272 is initially activated such that the plurality of gripper fingers 274 are collectively or simultaneously moved to their radially innermost position. Subsequently, the gripper air cylinder mechanism 276 is activated so as to effectively move the chuck or gripper mechanism 272 to the left, as viewed within FIG. 11, whereby the plurality of gripper fingers 274 will pass axially through the annular bushing 268 and into the counterbored region 270. At this time, the plurality of gripper fingers 274, which are provided with first, radially outwardly extending lip portions 278, will engage the a first annular rear lip portion 275 of the bushing 274 of the front end cap 264 of the bun storage tube 200, and upon reversal of movement of the chuck or gripper mechanism 272, by means of the gripper air cylinder mechanism 276, the chuck or gripper mechanism 272 will remove the front end cap 264 from the bun storage tube 200 as a result of the engagement of the gripper fingers 274 with the rear surface portion of the bushing 268. The buns, not shown, stored within the bun storage tube 200 are now ready to be dispensed or discharged from the front end portion of the bun storage tube 200. It is also noted that the plurality of fingers 274 of the gripper mechanism 272 are also collectively provided with second, radially outwardly extending lip portions 277 which are adapted to engage an annular front lip portion 279 of the bushing 268 so as to permit the end cap gripper mechanism 272 to replace the front end cap 264 onto the bun storage tube 200 as a result of a reversal of the operations previously noted in connection with the removal of the front end cap 264 from the bun storage tube 200.

Figure 13:
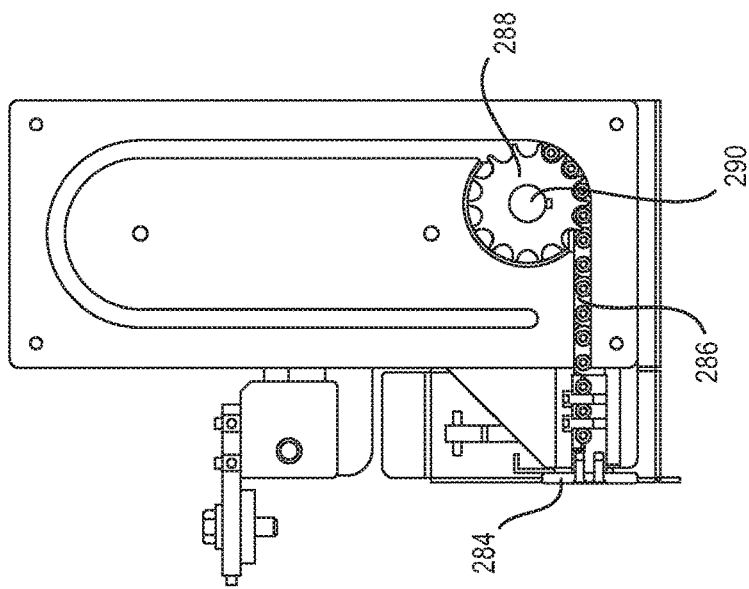
FIG. 13 is a cross-sectional view of the motor drive system as disclosed within FIG. 12.
Figure 12:
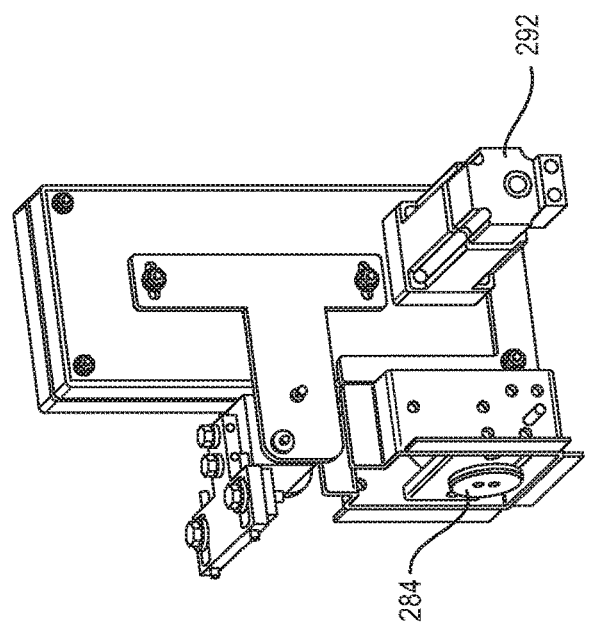
FIG. 12 is a schematic view disclosing the motor drive system utilized for moving the pusher block mechanism adapted to engage the rear end cap of the bun storage tube so as to incrementally advance the buns disposed within the bun storage tube for dispensing or discharge of the buns disposed within the bun storage tube.
Figure 11:
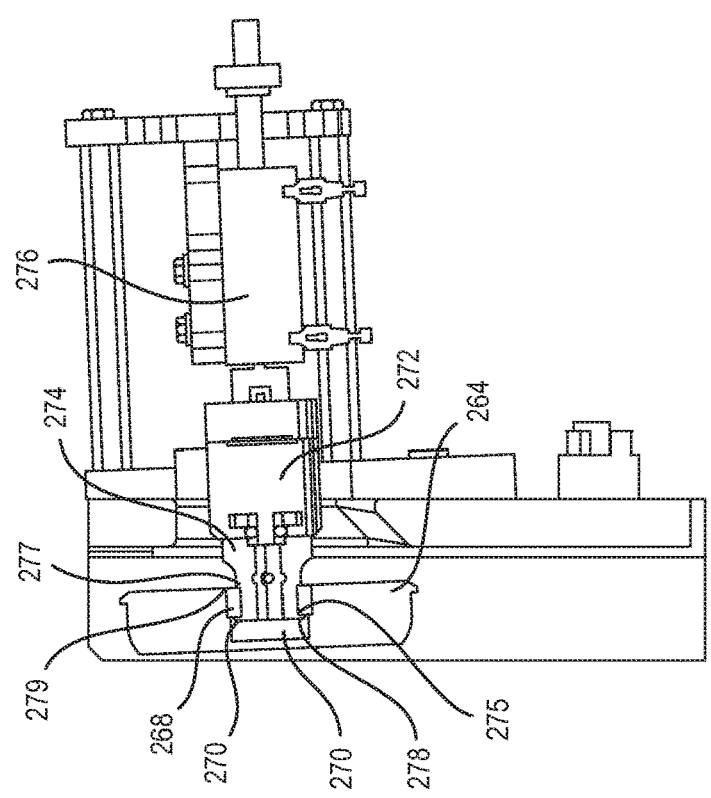
FIG. 11 is a schematic view disclosing the gripper mechanism utilized for removing and replacing the front end cap of the bun storage tube.
Figure 14:
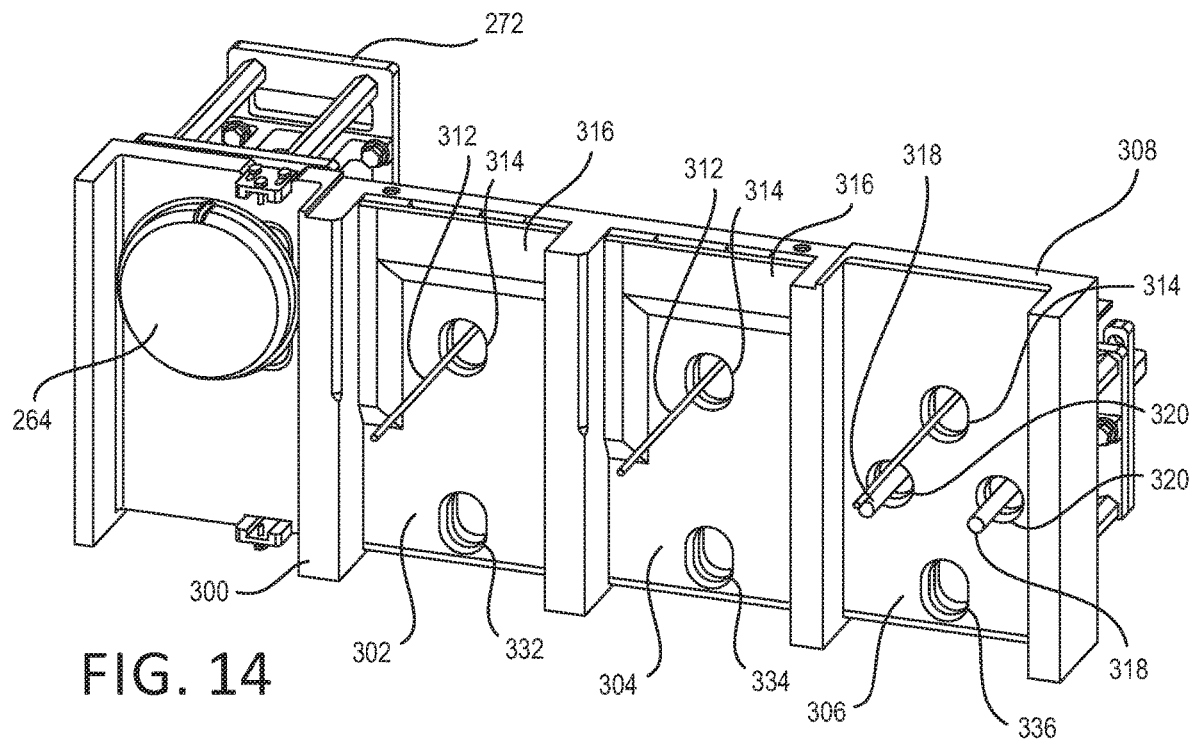
FIG. 14 is a perspective view of the bun separator.

Continuing further, and with reference again being made to FIGS. 9-12, it is seen that the annular rear end cap 266 is provided with a central opening 280, and that a bun tube puck 282 is disposed within the rear end portion of the bun storage tube 200 such that the leftwardmost surface portion of the bun tube puck 282 is engaged with an interior annular surface portion of the annular rear end cap 266, while the rightward portion 283 of the bun tube puck 282, which has a substantially arcuate or conical configuration as best seen in FIG. 10, is adapted to engage the trailing one of the plurality of buns, not shown, disposed within the bun storage tube 200. The bun tube puck 282 is adapted to be axially movable within the bun storage tube 200, in a precisely controlled incremental manner, so as to successively force or discharge the buns, not shown but disposed within the bun storage tube 200, out from the forward or discharge end of the bun storage tube 200. In order to accomplish this incremental movement of the bun tube puck 282, a pusher block 284, as seen in FIGS. 12 and 13, is adapted to be inserted into the central opening 280 defined within the annular rear end cap 266 of the bun storage tube 200. The pusher block 284 is fixedly connected to one end of a rigid chain 286 which is adapted to be routed around a sprocket wheel 288 which is fixedly mounted upon the rotary shaft 290 of a stepper motor 292. It is to be noted that a rigid chain, such as that disclosed at 286, is well known in the art and effectively comprises a chain that can be bent or displaced in only one direction. So, for example, as illustrated within FIG. 13, while the rigid chain 286 can effectively be bent or coiled around the sprocket wheel 288 in a substantially counterclockwise manner as viewed within FIG. 13, the rigid chain 286 cannot be bent in the opposite direction. Therefore, as it extends from the sprocket wheel 288 to its fixed connection with the pusher block 284, the chain 286 will effectively remain rigid and linear, will act as a linear actuator, and will effectively impart linear movement to the pusher block 284 and, in turn, to the bun tube puck 282, as the stepper motor 292 causes its rotary drive shaft 290, and the sprocket wheel 288 fixedly mounted thereon, to rotate, so as to in fact cause the incremental successive discharge of buns, not shown, from the discharge end of the bun storage tube 200. It is to be understood that the motor drive 292 will be controlled by means of a rotary encoder, not shown, which will be under the control of the programmable logic controller (PLC) 260 so as to achieve the incremental movement and discharge of the buns, not shown, from the discharge end of the bun storage tube 200.

With reference now being made to FIGS. 14-17, a bun separator assembly 300 is disclosed and is seen to comprise three bun housing sections 302,304,306 which are respectively provided to house or accommodate a bottom or heel section of a bun, an intermediate or club section of a bun, and a top or crown section of a bun. All three bun housing sections 302,304,306 are integrally mounted or fixed upon a laterally movable framework 308, as is the end cap gripper mechanism 272, such that the end cap gripper mechanism 272 moves laterally to the left or right, as viewed within FIG. 14, along with the bun housing framework 308. Accordingly, when a bun 201 is to be dispensed or discharged from the front end of one of the bun storage tubes 200, the front end cap 264 is initially removed by means of the end cap gripper mechanism 272 as has been previously disclosed and described, and subsequently, the laterally movable framework 308 is moved laterally toward the left, as viewed within FIG. 14, so as to, for example, now, in effect, coaxially align the heel housing section 302 with the bun storage tube 200 from which a heel section of a bun 201 may be dispensed or discharged into the heel housing section as a result of the actuation of the pusher block 284 as has been previously disclosed and described. It is additionally noted that in connection with the dispensing or discharge of any one of the bun sections into any one of its respective housing sections 302,304,306, a bun sensor 310, one of which is illustrated within FIG. 16 and which may comprise a laser rangefinder or similar type apparatus, is disposed behind each one of the bun separator housing sections 302,304,306. The bun sensors 310 are adapted to shine or project laser beams, schematically illustrated at 312 in FIG. 14, through apertures 314 defined within the rear walls of the bun separator housing sections 302, 304,306 such that the laser beams 312 will effectively determine the distance that the leading bun, being discharged from the bun storage tube 200, is located from the rear walls of the bun separator housing sections 302, 304,306 when a particular one of the bun separator housing sections 302, 304,306 is coaxially aligned with the bun storage tube 200. It is also noted, as can be appreciated from FIG. 14, the heel and club bun housing sections 302,304 are provided with substantially L-shaped cornices 316 fixedly mounted within the upper left corners of the housing sections, and the purpose of such cornices is to prevent the heel and club segments of the buns 201 from tilting forwardly and not being disposed substantially vertically.

It is noted at this juncture that when buns 201 are initially baked and packaged within the bun storage tubes 200, despite the fact that the heel, club, and crown sections of the buns 201 have been pre-sliced prior to their disposition or insertion into the bun storage tubes 200, a predetermined amount of adhesion nevertheless exists between the oppositely disposed flat or planar internal surface portions of the heel and club sections of the bun, and between the flat or planar internal surface portions of the club and crown sections of the bun, whereas this adhesion does not exist between the external, substantially semispherical surface portion of a crown section of a first bun and the external flat or planar surface portion of a heel section of a second bun disposed adjacent to, and in contact with, the crown section of the first bun, as may be appreciated from FIG. 1*a*, when the buns 201 are disposed within the bun storage tube 200. Therefore, although, for example, a heel section of the first bun 201 may be advanced, dispensed, or discharged from the bun storage tube 200 and effectively be inserted into the heel housing section 302 of the bun separator 300, the heel section of the bun 201 is not actually separated from the club section of the bun 201 until the bun separator assembly 300 is laterally moved toward the left, as viewed within FIG. 14, whereby the heel section of the bun 201 is effectively severed from the club section of the bun 201 as a result of the bun separator assembly 300 being moved toward the left whereby the club housing section 304 will now be brought into coaxial alignment with the bun storage tube 200. The preceding disclosure and description is effectively repeated in connection with the dispensing or discharge of the club and crown sections of the bun 201 into the respective club and crown housing sections 304,306 of the bun separator assembly 300, however, the dispensing or discharge of the crown section of the bun 201 from the bun storage tube 200 is a bit different.

More particularly, let us assume that the heel and club sections of the leading bun 201 have already been discharged from the bun storage tube 200 into their respective housing sections 302,304 of the bun separator assembly 300. Accordingly, the bun separator assembly 300 is now moved further toward the left so as to effectively coaxially align the crown section housing 306 of the bun separator assembly 300 with the bun storage tube 200. Therefore, the motor drive 292, the sprocket wheel 288, the rigid chain 286, and the pusher block 284 continue to push the serially arranged stack of buns 201 disposed within the bun storage tube 200 forward until the crown section of the bun 201 is disposed within the crown housing section 306 of the bun separator assembly 300. It will be recalled, however, that there is effectively no adhesion between the external substantially hemispherical surface portion of the crown segment of the bun 201 and the substantially flat planar external surface portion of the adjacent heel segment of the next or successive trailing bun 201. Accordingly, the crown segment of the bun 201 readily separates from the adjacent heel segment of the next, trailing bun 201 and would therefore immediately drop to the bottom of the crown housing section 306 which may possibly present additional problems in that the motor drive 292, and its associated operative components, would try to continue to discharge the next bun segment out from the bun storage tube 200. Therefore, in order to effectively prevent this, or to ensure that such a condition cannot happen, which may result in the destruction of a bun segment as the bun separator assembly 300 is moved laterally, the crown housing section 306 is provided with a pair horizontally spaced crown shelf members or rods 318,318 which project through apertures 320,320 formed within the rear wall of the crown housing section 306.

Figure 15:
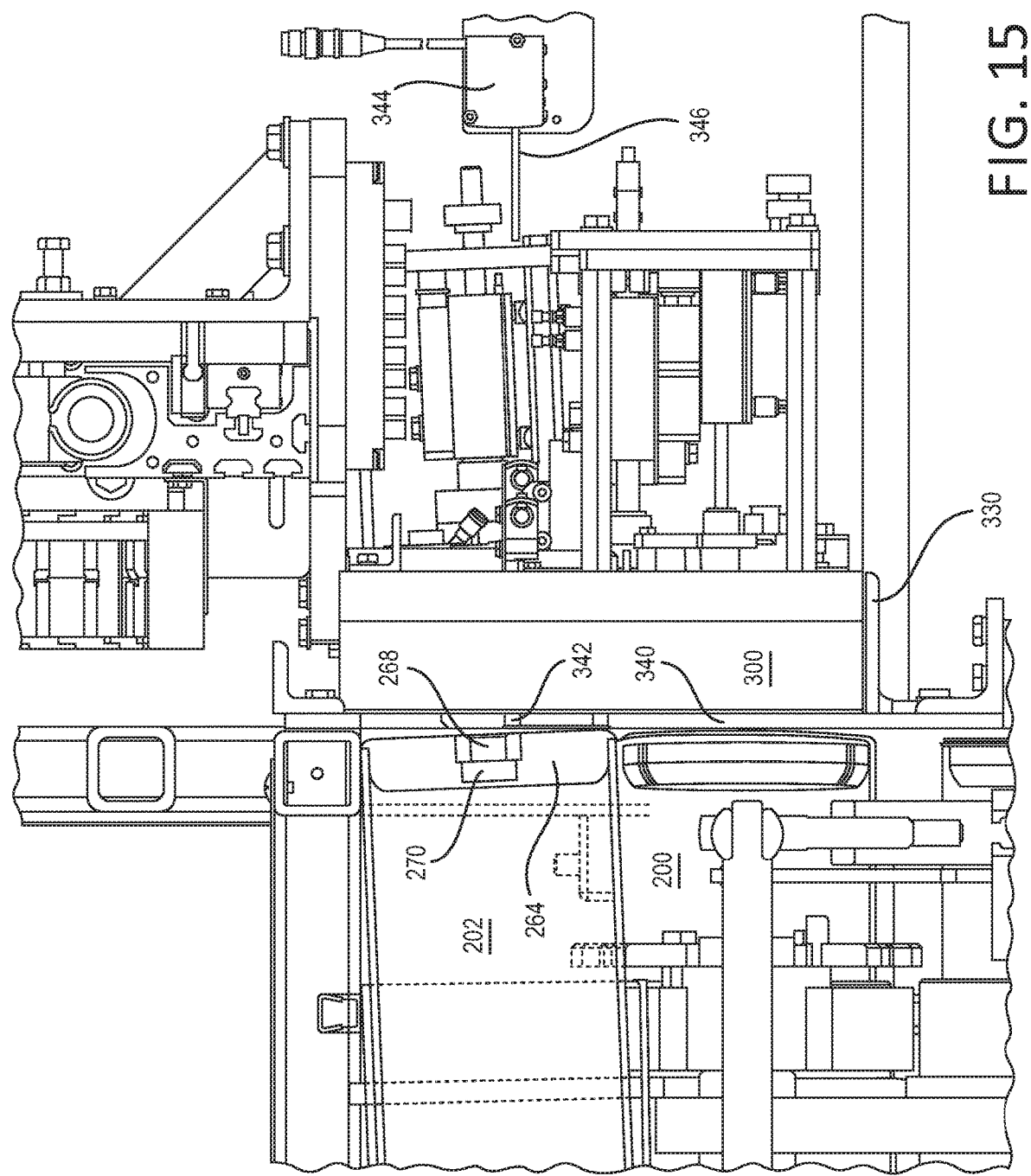
FIG. 15 is a cross-sectional view of the apparatus disclosing the bun gate at its elevated position at which the bun gate is interposed between the uppermost bun storage tube and the bun separator.
Figure 16:
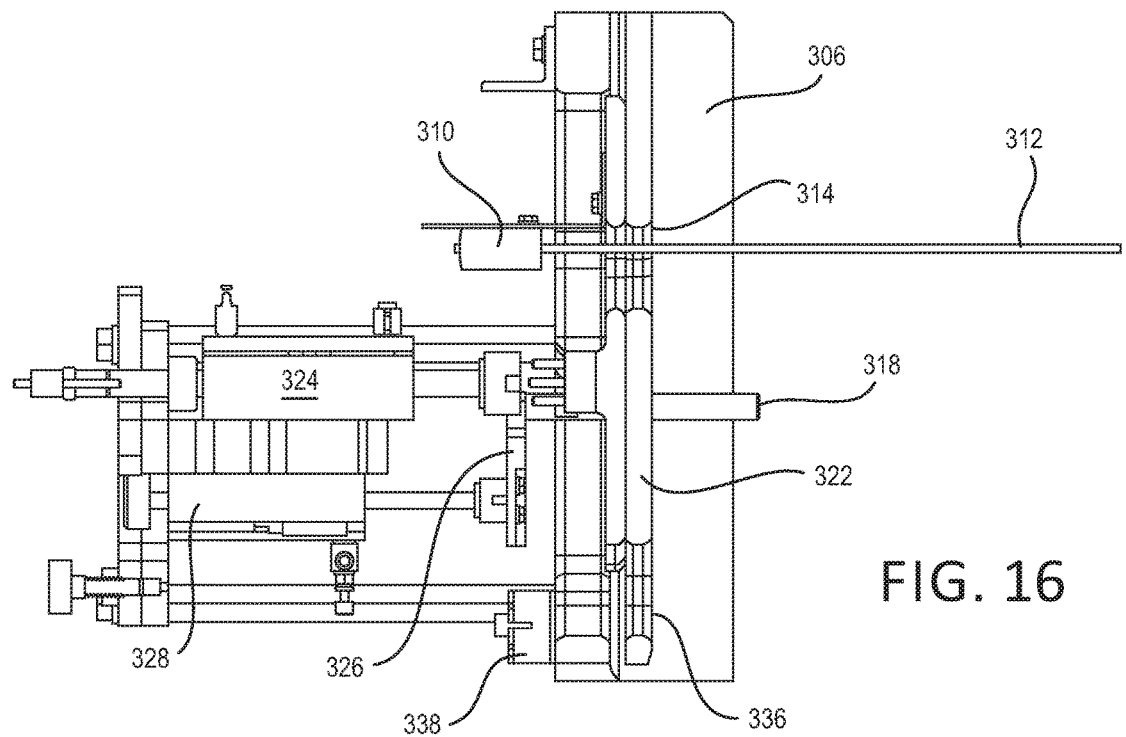
FIG. 16 is a cross-sectional view of the crown housing section of the bun separator showing the actuator for the crown shelves as well as the actuator for the rear plate member of the crown housing section of the bun separator.

As can best be seen in FIG. 16, the rear wall of the crown housing section 306 is actually formed by means of a movable plate 322 which is movable in the forward and rearward directions by means of a suitable pneumatic piston-cylinder assembly 324, and it is to be noted that this movable plate system may likewise be utilized in conjunction with the heel and intermediate club housing sections 302,304. In this manner, the effective depth of the housing sections 302,304,306 of the bun separator assembly 300 can be varied so as to accommodate different segments of different buns 201 having different thickness dimensions. In addition, it is also seen that the crown shelf members or rods 318, only one of which is seen in FIG. 16, are likewise fixedly attached at their rear ends to a mounting plate 326 which, in turn, is fixedly attached to the free distal end of a piston rod of a pneumatic piston-cylinder assembly 328 whereby the crown shelf members or rods 318 can be moved forwardly to extended positions at which they project into the crown housing section 306 of the bun separator assembly 300 so as to support the crown segment of a bun 201 thereon, or they can be moved to retracted positions at which they will no longer project outwardly from the plate 322 and the crown segment of the bun 201 will fall to the bottom of the crown housing section 306. As can best be seen in FIG. 15, and as has been noted previously, the bun separator assembly 300 moves laterally, that is, left and right as viewed in FIG. 14, or into and out from the page as viewed in FIG. 15, and is seen to effectively be disposed atop an angle iron 330 which effectively forms a floor portion for the bun separator assembly 300 upon which all of the bun segments will be disposed once they are fully deposited or inserted into their respective housing sections 302,304, 306 of the bun separator assembly 300. It is also noted, as can best be seen in FIGS. 14 and 16, that bun presence apertures 332,334,336 are respectively defined within the lower regions of the bun separator housing sections 302,304,306, and a plurality of photoeyes 338, only one of which is seen in FIG. 16, are disposed behind the rear walls of the bun separator housing sections 302,304,306 so as to detect the presence of the bun segments when they are in fact properly disposed within the lower regions of the bun separator housing sections 302, 304,306 and disposed upon the angle iron 330 which effectively forms the floor of the bun separator housing sections 302,304,306.

Figure 17:
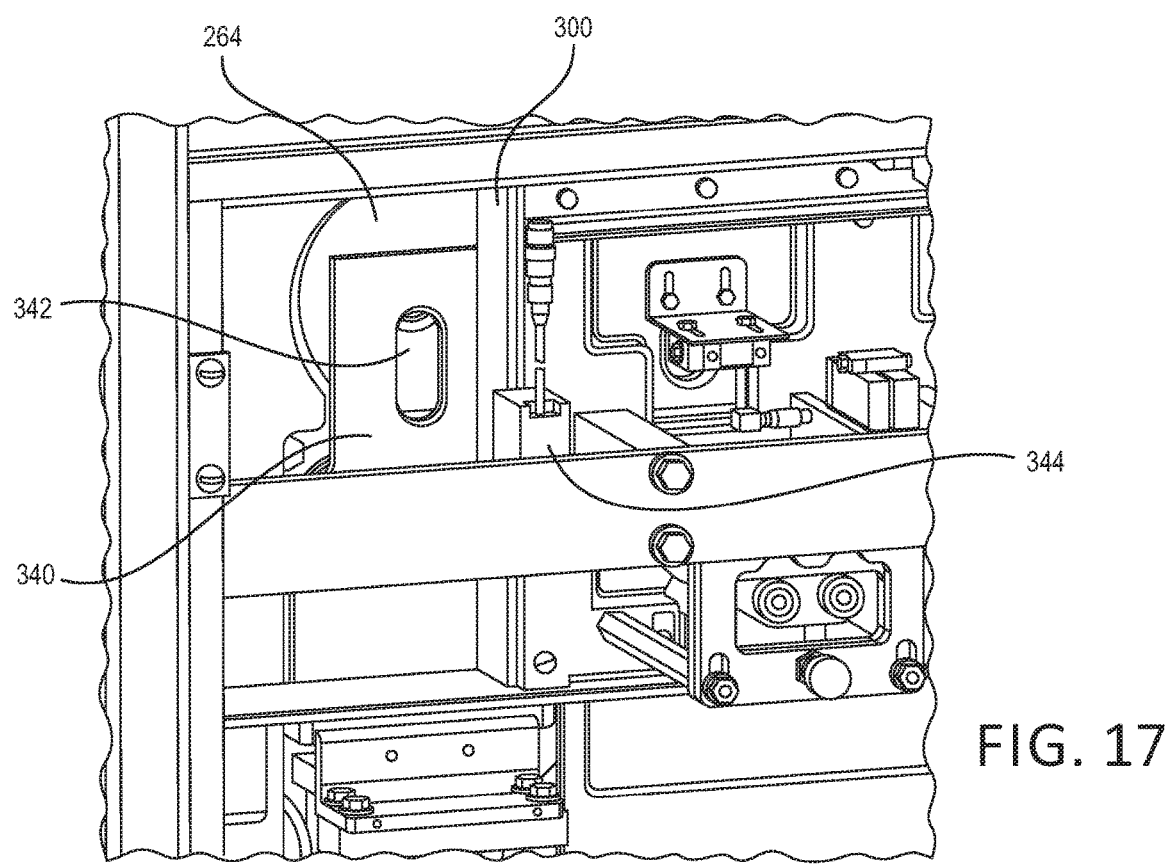
FIG. 17 is an enlarged perspective view corresponding to that of FIG. 15 disclosing the bun gate and its bun presence sensor.

Continuing further, and completing the description of the bun separator assembly 300 and its operation, reference is now made to FIGS. 15 and 17 wherein it is seen that a bun gate 340 is effectively interposed between the bun storage tube 202, disposed at the upper dead center dispensing or discharge position, and the bun separator assembly 300, the bun gate 340 being vertically movable between a raised position, as illustrated within FIGS. 15 and 17, and a lowered position by means of any suitable actuator, not shown. The bun gate 340 is provided with a through-aperture 342 which may be either a hole or a slot, and a bun sensor 344 is disposed behind the bun separator assembly 300 such that a laser beam 346 from the bun sensor 344 can detect the presence of a bun segment when the bun gate 340 is disposed at its elevated position and a bun segment has been discharged from the bun storage tube 202. As will now be disclosed and described, the bun gate 340 serves several purposes. When a first heel segment of the leading bun 201 is to be dispensed or discharged from the bun storage tube 202, the bun separator assembly 300 is moved all the way to its leftmost position, as viewed within FIG. 14, such that the chuck or gripper mechanism 272, which is fixedly mounted upon the bun separator assembly framework 308, can engage and remove the end cap 264. Subsequently, the bun gate 340 is then moved to its elevated position, and at this time, the bun separator assembly 300 is moved to its rightmost position. The motor drive 292 is then actuated so as to cause the pusher block 284 to engage the bun tube puck 282, thereby causing the heel segment of the leading bun to be moved out of the bun storage tube 202 and into engagement with the bun gate 340. The presence of the heel segment of the leading bun against the bun gate 340 is detected by means of the bun sensor 344, thereby assuring that the heel segment of the leading bun has in fact been partially discharged from the bun storage tube 202 and is disposed in a proper vertical orientation as a result of it being pressed against the forward vertical surface portion of the bun gate 340.

Subsequently, the bun separator assembly 300 is moved in the leftward direction until the first heel housing section 302 of the bun separator assembly 300 is coaxially aligned with the bun storage tube 202. The bun gate 340 is then lowered, and the motor drive 292 is again actuated so as to fully dispense or discharge the heel segment of the bun 201 into the heel housing section 302 of the bun separator assembly 300. It will be recalled that there is some residual adhesion defined between the heel segment of the bun 201 and the club section of the bun 201 whereby the heel section of the bun 201 will not readily separate from the club section of the bun 201 despite its insertion into the heel housing section 302 of the bun separator assembly 300, however, upon leftward movement of the bun separator assembly 300 to its next position at which the club housing section 304 of the bun separator 300 is now coaxially aligned with the bun storage tube 202, the heel segment of the bun 201 will be severed from the club section of the bun 201 whereby the heel segment of the bun 201 will drop vertically downward within the heel housing section 302 of the bun separator assembly 300 so as to be supported by means of the angle bracket 330 which effectively defines the floor region for the bun separator assembly 300. At this time, it is also to be noted that the bun photoeye 338, operatively associated with the heel housing section 302 of the bun separator assembly 300 will detect the presence of the heel segment of the bun 201 within the lower region of the heel housing section 302 of the bun separator assembly 300.

As a result of the club housing section 304 now being disposed coaxially with respect to the bun storage tube 202, the previous operational steps can be repeated so as to dispense or discharge the club segment of the bun 201 into the club housing section 304 of the bun separator assembly 300, additional leftward movement of the bun separator housing 300 resulting in the severance of the club segment of the bun 201 from the crown segment of bun 201 such that, again, in a similar manner, the presence of the club segment of the bun 201 within the lower region of the club housing section 304 will be detected by means of its bun photoeye 338. Since the crown housing section 306 of the bun separator assembly 300 is now coaxially aligned with the bun storage tube 202, the crown segment of the bun 201 can be dispensed or discharged from the bun storage tube 202, however, it is to be remembered that there is no adhesion defined between the external hemispherical crown surface portion of the crown segment of the bun 201 and the external flat planar heel surface portion of the next or trailing bun 201. Therefore, the crown segment of the leading bun 201, upon being dispensed or discharged from the bun storage tube 202, will tend to immediately separate from the heel segment of the next trailing bun 201 and would also otherwise tend to fall into the bottom region of the crown housing section 306 of the bun separator assembly 300 which is not desirable because the motor drive 292 and the pusher block 284 will tend to keep dispensing or discharging the heel segment of the next or trailing bun 201. Since the bun separator assembly 300 is now going to be moved to its rightmost position so as to once again coaxially align the chuck or gripper mechanism 272 with the bun storage tube 202 so as to replace the end cap 264 onto the bun storage tube 202, since an entire bun dispensing or discharging cycle has been completed, any further dispensing or discharge of the next or trailing bun segment may effectively be destroyed as a result of being caught or crushed as a result of the lateral, rightward movement of the bun separator assembly 300 with respect to the bun storage tube 202.

Therefore, to prevent this scenario from occurring, and as has been discussed previously, the crown housing section 306 of the bun separator assembly 300 is provided with the crown shelf members or rods 318 upon which the crown segment will be supported so as to prevent any further dispensing or discharge of a bun segment from the bun storage tube 202. In addition, immediately subsequent to the disposition of the crown segment of the leading bun 201 being disposed upon the crown shelf members or rods 318, the bun gate 340 is again moved to its elevated position so as to be interposed between the crown segment of the leading bun 201 from the heel segment of the next or trailing bun 201 and thereby definitively ensure that the crown segment of the leading bun 201 is in fact separated from the heel segment of the next or trailing bun 201. Once the bun gate 340 has been raised to its elevated position and the crown segment of the leading bun 201 is in fact separated from the heel segment of the next or trailing bun 201, the the crown shelf members or rods 318 are retracted, thereby permitting the crown segment of the bun 201 to fall into the lower region of the crown housing section 306, the disposition of the crown segment within the lower region of the crown housing section 306 is confirmed by means of the photoeye 338 operatively associated with the crown housing section 306 of the bun separator assembly 300, the bun gate 340 is then lowered to its lowermost position, and the bun separator assembly 300 is moved to its rightmost position so as to coaxially align the chuck or gripper mechanism 272 with the bun storage tube 202 whereby operation of the chuck or gripper mechanism 272, in a reverse mode with respect to that described in connection with the removal of the end cap 264 from the bun storage tube 202, can be achieved.

Once the bun dispensing or discharging operation has been completed and the bun segments are disposed within their respective housing sections of the bun separator assembly 300, and the end cap 264 has been replaced upon the bun storage tube 202, the bun segments must be transported to bun rotators and then toaster appliances so that the bun segments can be properly toasted in connection with the preparation of a particular type of sandwich, all of which will be disclosed and described shortly. It is to be noted that if the sandwich is to comprise a two bun-segment type sandwich, such as, for example, to create a hamburger, then the heel and crown sections of the bun are inserted into the club housing section 304 and the crown housing section 306 such that the bun segment receiving sections of the bun separator assembly 300 are disposed adjacent to each other—this makes the system more operatively efficient as opposed to insert the heel segment of the bun into the heel housing section 302 of the bun separator assembly 300 while inserting the crown segment of the bun into the crown housing section 306 of the bun separator assembly 300 with the central club housing section 304 being empty and requiring that the linear actuator, not shown, powering the lateral movements of the bun separator assembly 300, must effectively skip over or bypass the club housing section 304. Conversely, if the sandwich is to comprise a three bun-segment type sandwich, such as, for example, to create a Big Mac®, then the heel, club, and crown segments of the bun are in fact deposited within their respective heel, club, and crown housing sections 302, 304,306 of the bun separator assembly 300.

Figure 18:
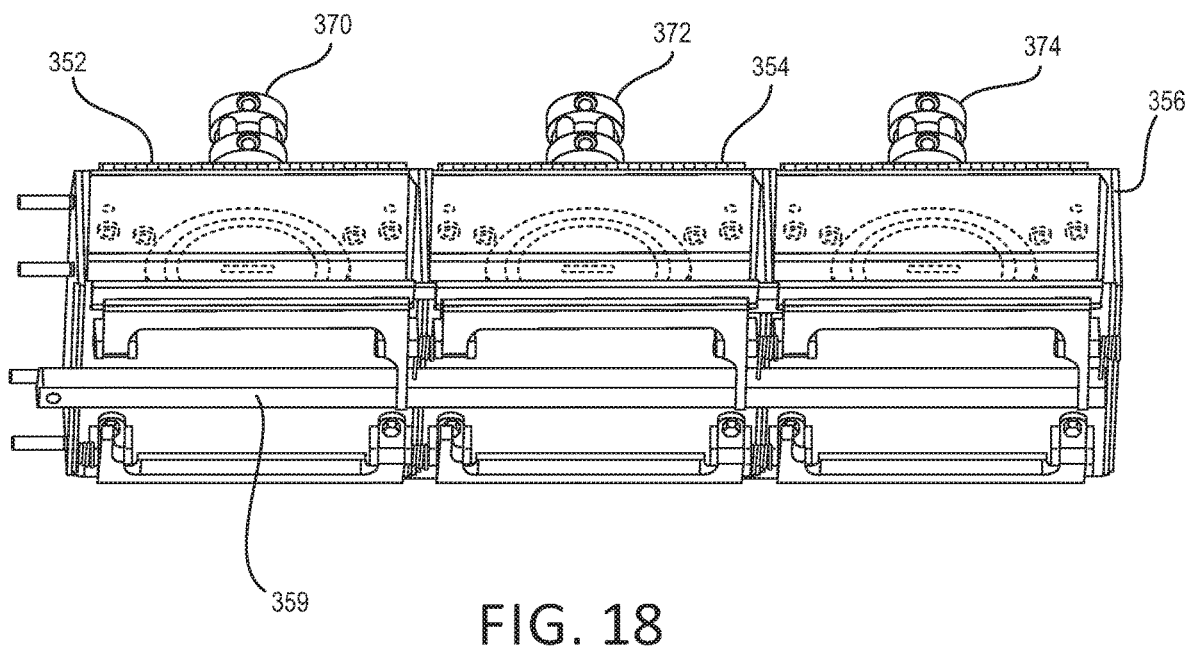
FIG. 18 is a perspective view of the bun rotator mechanism.
Figure 19:
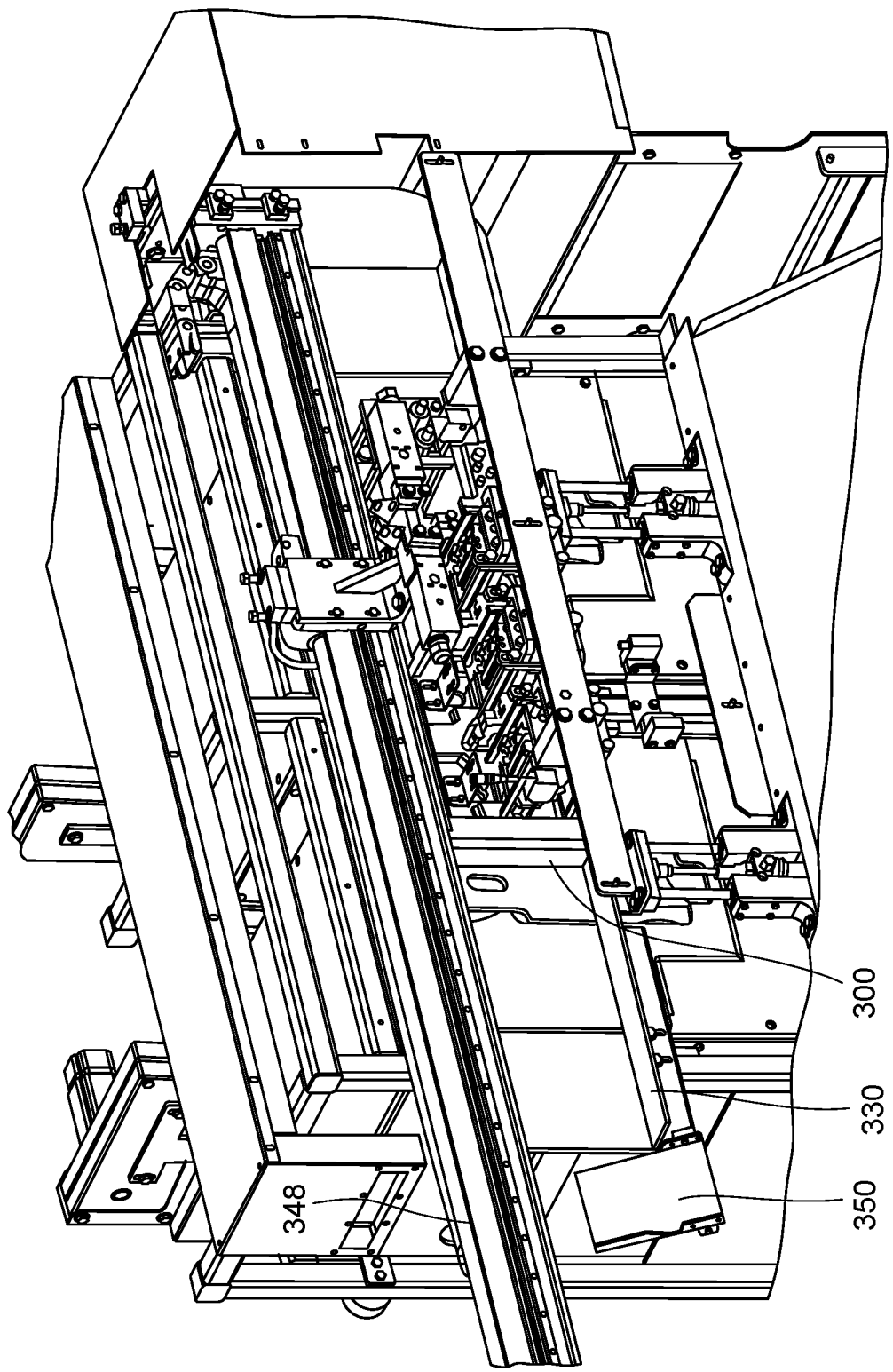
FIG. 19 is a perspective view showing the laterally movable bun separator as suspendingly supported from its mounting rail and movable with respect to the floor angle iron, as well as with respect to the chute member so as to deposit bun sections upon the chute member depending upon the lateral disposition of the bun separator.

With reference now being made to FIGS. 18-21, and as can best be appreciated from FIG. 19, after the bun segments have been deposited within their respective heel, club, and crown housing sections 302, 304,306 of the bun separator assembly 300, the bun separator assembly 300 is laterally moved by means of a suitable linear actuator, not shown, along a horizontally or transversely oriented rail system 348 in a suspended manner. As the bun separator assembly 300 is moved from right to left, as viewed within FIG. 19, the various bun segments from the housing sections 302, 304, 306 of the bun separator assembly 300 will be deposited upon a chute 350. It will be noted that the angle iron 330, as disclosed within FIGS. 15 and 19, and which effectively served as a floor over which the bun separator assembly 300 moved laterally, terminates at the chute 350 whereby, as the bun separator assembly 300 continues to move from the right to the left, as viewed within FIG. 19, the successive housing sections 302,304,306 of the bun separator assembly 300 will successively move beyond the leftwardmost extent of the angle iron 330 and therefore, the bun segments, disposed within the housing sections 302,304,306 of the bun separator assembly 300, will simply drop onto the chute 350. As shown within FIGS. 18 and 21, the system 100 of the present invention also comprises three bun rotators 352,354, 356 which are mounted upon a first linear railing and actuating system 358 for lateral or transverse movement in the leftward and rightward directions as viewed, for example, within FIG. 21. In addition, the three bun rotators 352,354,356 are also mounted upon a second linear railing and actuating system 360 which is, itself, mounted upon the first linear railing and actuating system 358 so as to permit the three bun rotators 352, 354,356 to be moved in a perpendicular direction with respect to its lateral or transverse direction of movement along the first linear railing and actuating system 358.

Figure 21:
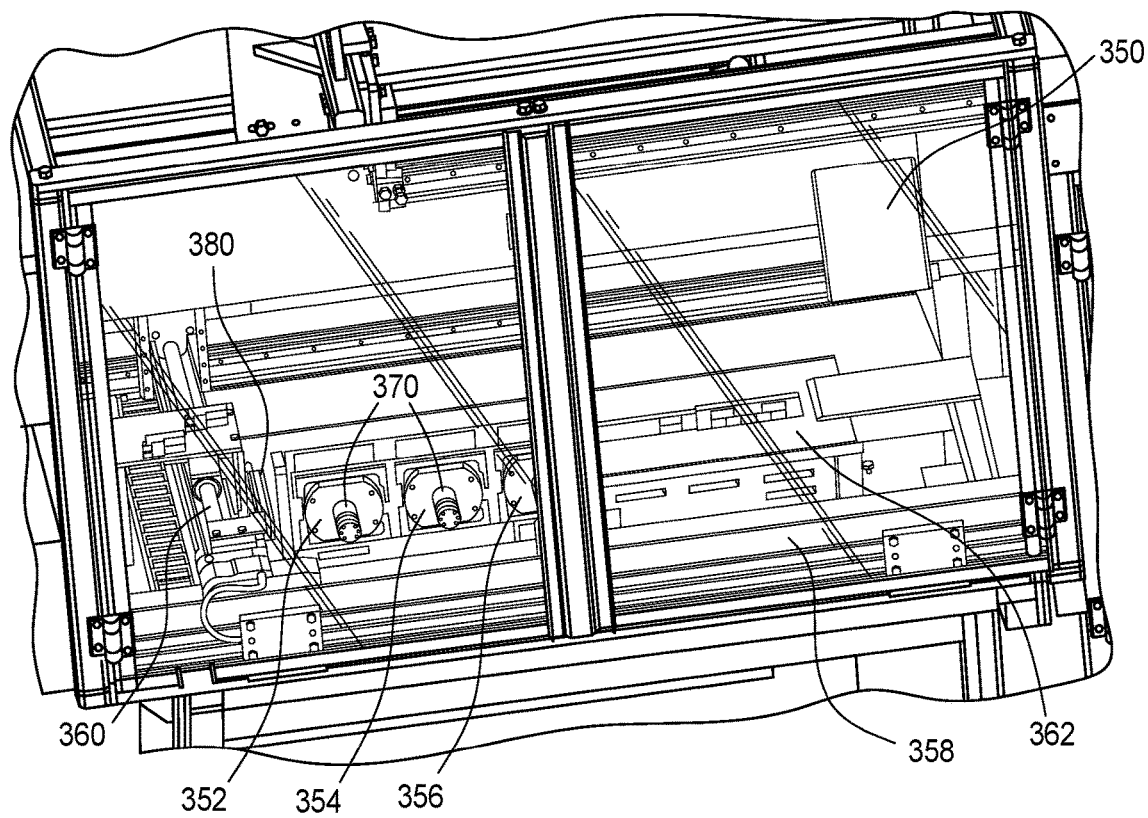
FIG. 21 is a schematic view showing the mounting of the bun rotators upon its two actuator systems for movement in longitudinal and transverse or X/Y directions, as well as its connection to a rotary actuator for permitting the bun rotator to be moved in opposite 180° directions.
Figure 22:
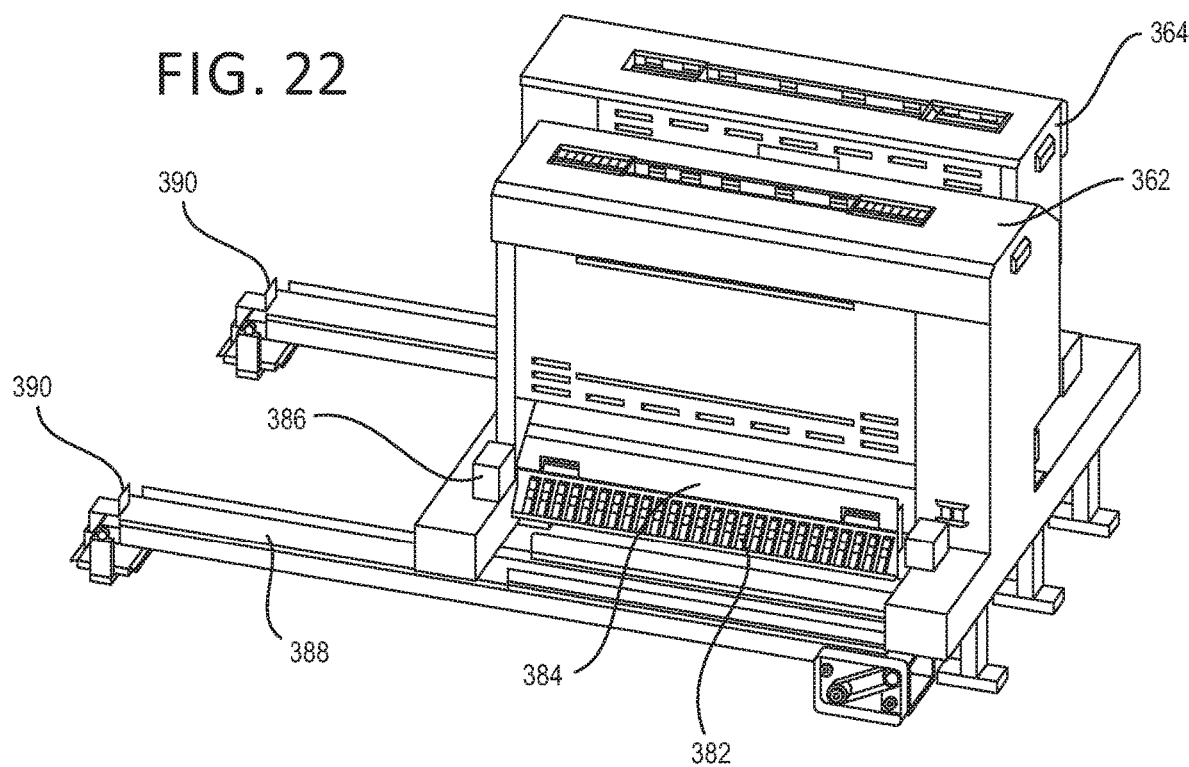
FIG. 22 is a perspective view of the toaster appliances as well as the conveyor mechanism operatively associated therewith.

A pair of toaster appliances 362,364 are disclosed within FIG. 22, and at least one of the toaster appliances 362,364 can also be seen within FIG. 21, and accordingly, it can now be appreciated that the mounting of the three bun rotators 352,354,256 upon the first linear railing and actuating system 358 not only permits the three bun rotators 352,354,356 to move toward the rightmost position, as viewed within FIG. 21 such that the three bun rotators 352,354,356 are successively disposed beneath the chute 350 in order to individually and respectively receive the three bun segments from the chute 50, but in addition, the three bun rotators 352,354, 356 can then be moved along the first linear railing and actuating system 358 so as to individually and successively deposit the bun segments into proper bun segment reception slots, not shown, defined within either one of the toaster appliances 362,364. In addition, it is to be further appreciated that the provision of the second linear railing and actuating system 360 permits the three bun rotators 352,354,356 to be moved in the noted perpendicular direction, with respect to its movement along the first linear railing and actuating system 358, so as to enable the three bun rotators 352,354,356 to be moved in the noted perpendicular direction so as to be capable of transferring the bun segments from the three bun rotators 352,354,356 into either one of the toaster appliances 362,364.

Figure 20:
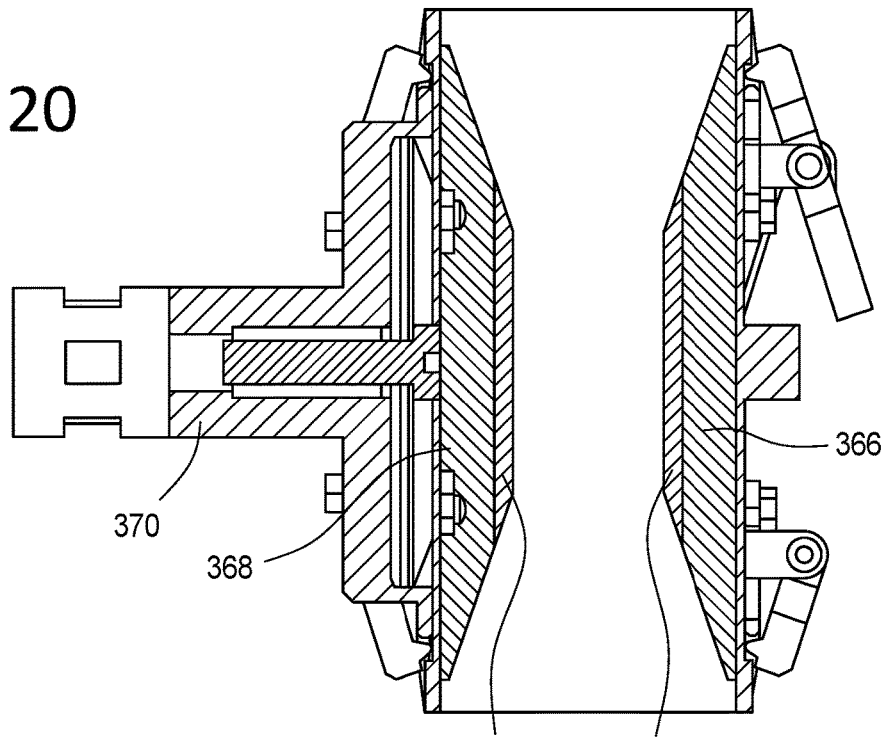
FIG. 20 is a cross-sectional view of one of the bun rotators.

Still further, in connection with FIGS. 18,20, and 21 that each one of the three bun rotators 352,354,356 effectively defines a mounting plate system comprising a first, fixed, foam-backed mounting plate 366, and a second movable mounting plate 368 to which is respectively attached a pneumatic piston-cylinder assembly 370, 372,374, all three of which are disclosed within FIG. 18 but only one of which is disclosed within FIG. 20. Interior surface portions of the first and second mounting plates 366,368 are provided with non-stick sheets 376,378 such that when the second movable mounting plate 368 is actuated so as to move toward the first fixed mounting plate 366 and thereby secure the bun segment therebetween, the bun segment will not stick or adhere to either one of the mounting plates 366,368. It is lastly seen, with reference again being made to FIG. 21, that the three bun rotators 352,354,356 are collectively connected to a rotary actuator mechanism 380 such that the three bun rotators 352,354,356 can be collectively rotated 180° in opposite directions. It can be appreciated from FIG. 18 that the three bun rotators 352,354,356 are all fixedly connected to a common transverly oriented mounting bar or rail 359. This mounting and actuation system permits the three bun rotators 352,354,356 to collectively rotate relative to the toaster appliances 362,364 so as to ensure, for example, that when the three segments of the bun 201 are inserted into the proper locations defined within the toaster appliances 362, 364, the heel and crown segments of the bun will be toasted only upon one side thereof, that is, the interior surface portions of the heel and crown segments, while with respect to the club segment of the bun, both sides of the club segment of the bun 201 will be toasted.

Figure 23:
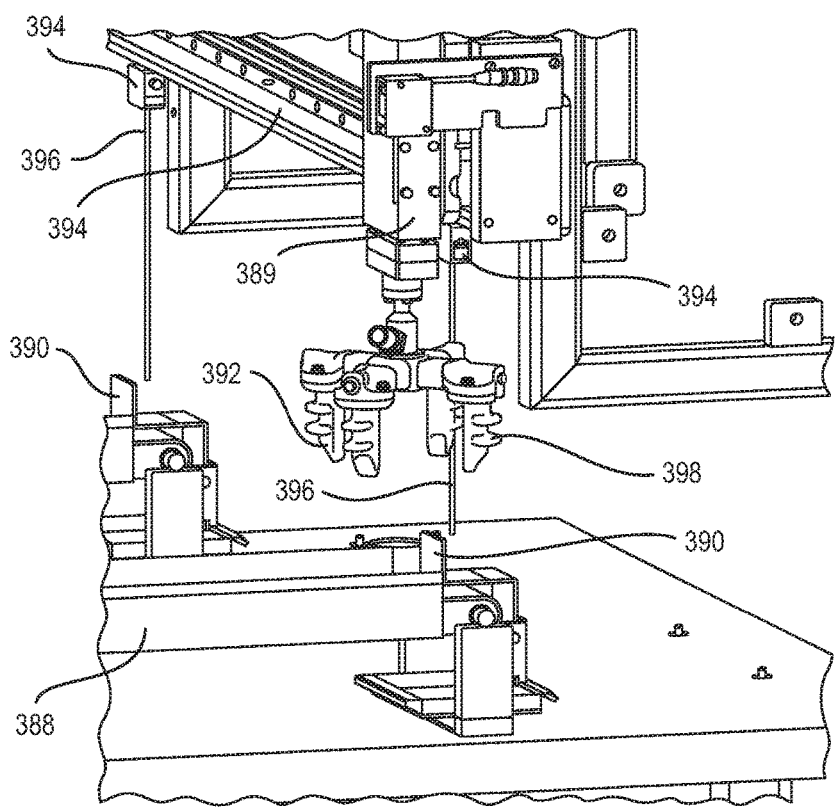
FIG. 23 is a first embodiment of a bun pickup device for retrieving a toasted bun from the conveyor mechanism as shown in FIG. 22.

With reference continuing to be made to FIG. 22, after the various bun segments are inserted into either one of the toaster appliances 362,364 so as to undergo their toasting operations, the bun segments will be conveyed downwardly through the toaster appliances so as to be toasted to a predetermined degree as the segments travel continuously along their toaster paths. Various bun segment sensors, not shown, may be incorporated internally within the toaster appliances so as to ensure that the bun segments are in fact being properly conveyed in their downward directions through the toaster appliances 362,364. When the toasting operation is completed, the toasted bun segments fall onto a bun ramp 382 which has been illustrated within FIG. 22 for clarity purposes, but normally, such bun ramp 382 would not be visible because a bun gate 384 actually covers the bun ramp 382. The bun gate 384 is operatively connected to a pair of bun gate rotators 386,386 disposed at opposite ends of the bun gate 384, and the bun ramp 382 has a plurality of bun ramp sensors, not shown, operatively associated with the bun ramp 382 so as to ensure that all bun segments that have travelled through the toaster appliances 362,364, and have been toasted, have in fact reached the bump ramp 382. Accordingly, when the bun ramp sensors, not shown, sense the disposition of the bun segments upon the bun ramp 382, the bun ramp sensors will transmit a signal to the bun ramp rotators 386,386 so as to rotate the bun gate 384 from its normally CLOSED position to an OPEN position whereby the bun segments will fall down onto a transversely oriented linear bun conveyor 388. At this point in time, the bun conveyor 388 is activated until a bun segment reaches the end of the bun conveyor 388 as determined by means of an upstanding bun stop 390 which has been illustrated both within FIGS. 22 and 23. Simultaneously therewith, as is also illustrated within FIG. 23, a bun segment gripper assembly 392, mounted upon an overhead linear actuator and railing assembly 394 for vertical movement toward and away from the bun conveyor 388 by means of a suitable actuator 389, is moved into position above the bun segment which has been stopped at the bun stop 390, and as guided to the precise position above the stopped bun segment by means of a bun stop sensor 394 generating a laser beam 396. The bun segment gripper assembly 392 is then lowered such that a plurality of fingers 398 can be moved radially inwardly with respect to each other so as to, grasp the bun segment, remove it from the bun conveyor 388, and move it downstream to an additional food item preparation station such as, for example, a condiment dispensing station for dispensing pre-selected condiments to be applied to the bun segment.

Figure 25:
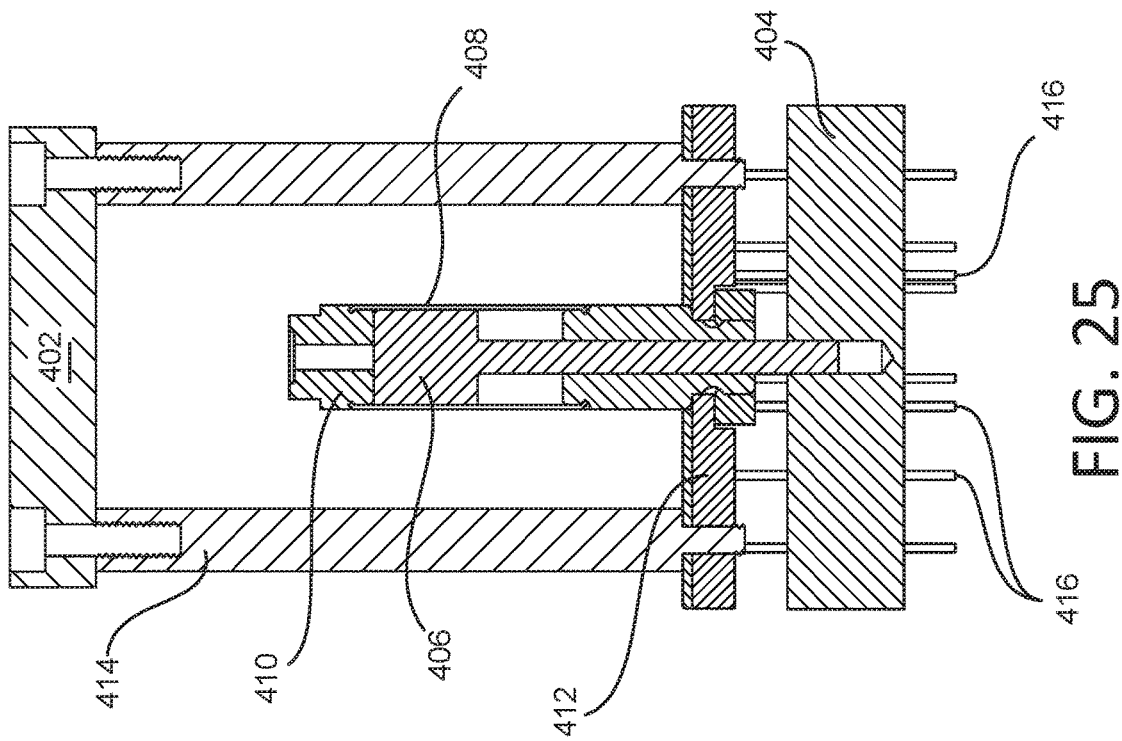
FIG. 25 is a vertical cross-sectional view of FIG. 24 more clearly showing the operation of the various components of the second embodiment of the bun pickup device for retrieving a toasted bun from the conveyor mechanism as shown in FIG. 22.
Figure 24:
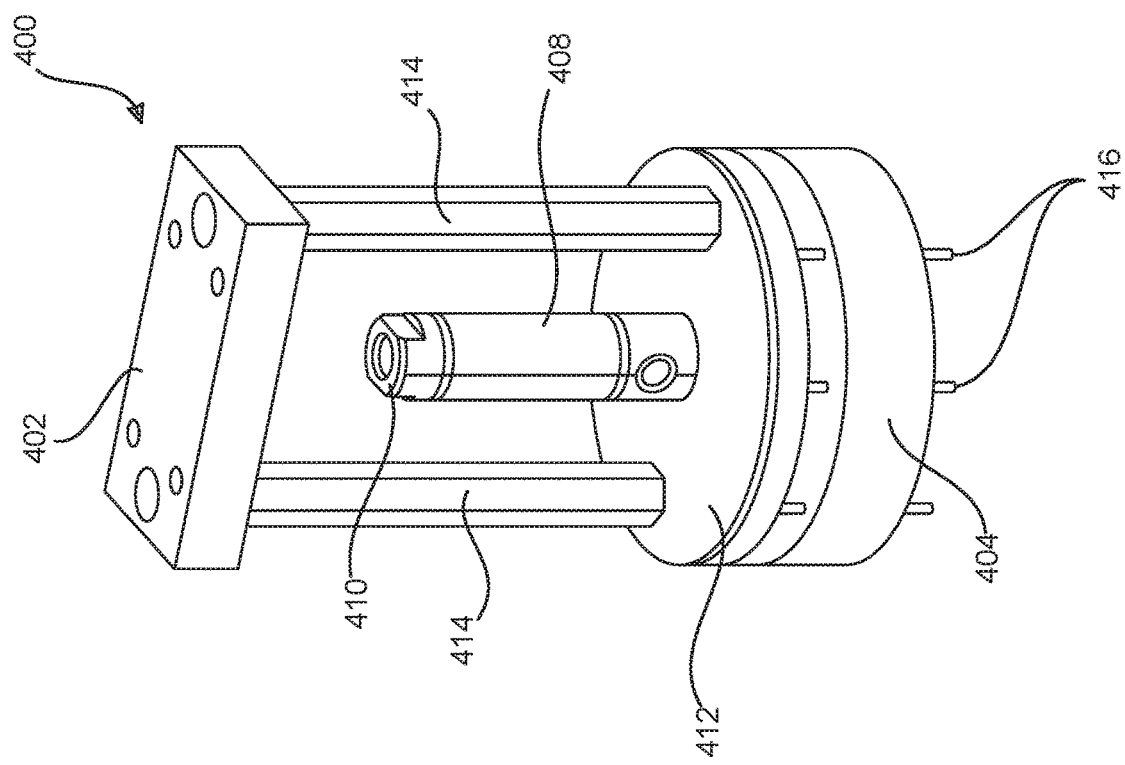
FIG. 24 is a perspective view of a second embodiment of a bun pickup device for retrieving a toasted bun from the conveyor mechanism as shown in FIG. 22.

With reference lastly being made to FIGS. 24 and 25, an alternative bun segment pickup system 400, for picking up the bun segments disposed against the upstanding bun stop 390, is disclosed. In lieu of the bun segment gripper assembly 392 disclosed within FIG. 23, the bun segment pickup system 400 comprises an upper mounting plate 402 which is adapted to be operatively connected upon the lower end of a suitable actuator, not shown but similar to the actuator 389 illustrated within the system disclosed and described in connection with FIG. 23. Accordingly, the bun segment pickup system 400 can be moved vertically so as to be lowered or raised relative to the bun segment disposed upon the end of bun conveyor 388 and disposed at its predetermined location along the bun conveyor 388 by means of the upstanding bun stop 390. In addition, it is seen that a bun segment discharge plate 404 is fixedly mounted to the lower distal end of a piston 406 which is disposed within a cylinder 408 of a pneumatic piston-cylinder assembly 410 which is fixedly secured within a lower mounting plate 412 which, together with a pair of columns 414,414 and the upper mounting plate 402, effectively form the framework for the bun segment pickup system 400.

Still further, it is seen that a plurality of vertically oriented, dependent needles 416, which are fixedly mounted within the lower mounting plate 412, project downwardly and pass through the bun segment discharge plate 404 such that the bun segment discharge plate 404 is movable relative to the plurality of needles 416. Normally, the bun segment discharge plate 404 is disposed at an elevated position, as defined by the upward movement of the piston 406 within the cylinder 408 of the piston cylinder assembly 410, and subsequently, the entire bun segment pickup system 400 is lowered by means of its pneumatic actuator, not shown, to which the upper mounting plate 402 is connected. It is to be noted that when the bun segments, particular the heel and crown segments of the bun, which are to be toasted only upon their interior surface portions, are, inserted into the toaster appliances 362,364, the bun segments will be properly oriented so as to in fact ensure that they are only toasted upon their interior surface portions. In addition, when the bun segments are discharged onto the bun ramp 382, the bun segments will in fact be properly oriented such that the interior toasted surface portions of the bun segments face upwardly. In this manner, or as a result of such lowered movement of the entire bun segment pickup system 400, the plurality of dependent needles 416 will penetrate the toasted internal side of the heel or crown segments of the bun, or either toasted side of the club segment of the bun, so as to effectively grasp the bun segment as a result of the penetration of the bun segment by means of the plurality of dependent needles 416, the penetrated surface of the bun segment being disposed in contact with the undersurface portion of the bun segment discharge plate. The bun segment pickup system 400 is then moved downstream to another food item preparation station at which time the piston 406 will be extended or lowered with respect to the cylinder 408 which will, in turn, cause the bun segment discharge plate 404 to move downwardly, relative to the plurality of needles 416, whereby the bun segment discharge plate 404 will effectively push the bun segment off the distal end portions of the plurality of needles 416 such that the bun segment can now have, for example, condiments dispensed onto it.

Obviously, many variations and modifications of the present invention are possible in light of the above teachings. For example, when a particular bun storage tube 200 is empty, or when the supply of buns within the particular bun storage tube 202 has been completely exhausted or depleted, which condition can be sensed by means of suitable sensors, not shown, the endless conveyor or carousel, carrying the plurality of bun storage tubes 202, will be rotated in a stepwise manner so as to present or dispose a fully loaded bun storage tube 202 to the uppermost or top dead center position at which the buns 201 disposed within this bun storage tube 202 can then be dispensed or discharged. It is also to be appreciated that the cabinets 102 comprise various doors 103 which can be opened whereupon food preparation personnel can extract an exhausted or depleted bun storage tube 200 and can be manually refilled or replaced by means of a new or fresh bun storage tube 200 such that the plurality of bun storage tubes 200 are always properly stocked in order to permit the system 100 to be operated in a continuous manner without any operational downtime. Still yet further, it is to be noted that the various surfaces of the system components, such as, for example, the interior surface portions of the bun storage tubes 200, and/or the internal surface portions of the housing sections of the bun separator assembly 300, can be provided with non-stick surface coatings so as to prevent any of the bun segments from sticking or adhering to such surfaces. Lastly, a user interface, not shown, can be provided upon one of the bun storage cabinets 102, or upon one of the toaster appliances, such that a patron order can be entered into the system 100 by means of the user interface which would effectively serve as the 'point of sale" location. It is lastly noted that while this disclosure has been directed toward food buns, the disclosed apparatus or system is equally applicable to other food items. It is therefore to be understood that within the scope of the appended claims, the present invention may be practiced otherwise than as specifically described herein.

What is claimed as new and desired to be protected by Letters Patent, is:

1. An automated bun feeding and toasting system for feeding and toasting buns in accordance with a food preparation order, comprising:
   a plurality of buns comprising at least one crown bun segment and at least one heel bun segment wherein each crown segment comprises a main curved surface and a peripheral surface, while each heel bun segment comprises at least one flat main surface and a peripheral surface;
   a plurality of horizontally oriented bun storage tubes mounted upon a carousel, wherein each one of said plurality of horizontally oriented bun storage tubes, mounted upon said carousel, houses said plurality of buns comprising said at least one crown bun segment and said at least one heel bun segment such that said peripheral surfaces of said at least one crown bun segment and said at least one heel bun segment are disposed in contact with inner peripheral surface portions of each one of said plurality of bun storage tubes, and wherein said main curved surface of said at least crown bun segment is disposed in surface-to-surface contact with a crown surface or heel surface of another bun segment;
   a bun pusher mechanism operatively associated with a particular one of said plurality of bun storage tubes for discharging a bun segment from said particular one of said plurality of bun storage tubes;
   at least one toaster appliance for receiving bun segments discharged from said particular one of said plurality of bun storage tubes and for toasting the bun segments discharged from said particular one of said plurality of bun storage tubes; and
   a conveyor system for conveying the bun segments discharged from said particular one of said plurality of bun storage tubes to said at least one toaster appliance.

2. The system as set forth in claim 1, wherein:
said plurality of bun storage tubes are disposed upon a carousel or endless conveyor such that said particular one of said plurality of bun storage tubes are moved to a predetermined bun discharge location defined upon said carousel or endless conveyor.

3. The system as set forth in claim 1, wherein:
each one of said plurality of bun storage tubes comprises a front end cap; and
said system comprises a front end cap gripping mechanism for removing said front end cap from said particular one of said plurality of bun storage tubes when a bun is to be discharged from said particular one of said plurality of bun storage tubes, and for replacing said front end cap back onto said particular one of said plurality of bun storage, tubes when the bun has been completely discharged from said particular one of said plurality of bun storage tubes.

4. The system as set forth in claim 1, wherein:
each one of said plurality of bun storage tubes comprises a rear end cap; and
said bun pusher mechanism comprises a stepper motor and a pusher block operatively connected to said stepper motor and adapted to be engaged with said rear end cap of particular one of said plurality of bun storage tube so as to incrementally advance the plurality of buns disposed within said particular one of said plurality of bun storage tubes such that a leading one of said plurality of buns disposed within said particular one of said plurality of bun storage tubes is discharged from said particular one of said plurality of bun storage tubes in accordance with incremental steps of said stepper motor.

5. The system as set forth in claim 4, wherein:
said stepper motor is operatively connected to said bun pusher mechanism by a rigid chain.

6. The system as set forth in claim 1, further comprising:
a bun separator comprises a housing having at least two housing sections for respectively accommodating heel and crown segments of a bun.

7. The system as set forth in claim 6, wherein:
said bun separator housing comprises three housing sections for respectively accommodating heel, intermediate club, and crown segments of a bun.

8. The system as set forth in claim 7, wherein:
rear wall portions of at least one of said three housing sections of said bun separator comprises a movable plate so as to effectively adjust the depth of said at least one of said three housing sections of said bun separator so as to accommodate different bun segments having different depth dimensions.

9. The system as set forth in claim 8, further comprising:
a vertically movable gate for separating a crown segment of a first bun from a heel or intermediate club segment of a second adjacent bun disposed within said particular one of said plurality of bun storage tubes as the crown segment of the first bun is being discharged from said particular one of said plurality of bun storage tubes.

10. The system as set forth in claim 9, further comprising:
shelf members operatively associated with said crown housing section of said bun separator for preventing the downward movement of the crown segment of the bun after said vertically movable gate has separated the crown segment of the bun from one of the heel or intermediate club segments of the bun.

11. The system as set forth in claim 10, wherein:
said shelf members are movable between extended positions, at which said shelf members support the crown segment of the bun and prevent the crown segment of the bun from moving downwardly within said crown housing section of said bun separator, and a retracted position at which the crown segment of the bun is permitted to fall into a lower region of said crown housing section of said bun separator.

12. The system as set forth in claim 11, further comprising:
a plurality of photoeyes respectively operatively associated with lower region portions of said three housing sections of said bun separator so as to ensure that all segments of the bun are disposed within said lower regions of said three housing sections.

13. The system as set forth in claim 7, further comprising:
a bun rotator assembly comprising a plurality of bun rotators fixedly connected together for respectively receiving the heel, intermediate club, and crown segments of the bun and for rotating the heel, intermediate club, and crown segments of the bun to a proper orientation so as to be properly toasted within said at least one toaster appliance.

14. The system as set forth in claim 13, further comprising:
a bun rotator mechanism operatively connected to said bun rotator assembly for rotating said bun rotator assembly in opposite directions, each opposite direction comprising 180°.

15. The system as set forth in claim 13, further comprising:
a chute mechanism for conveying the heel, intermediate club, and crown segments of the bun to said bun rotator assembly.

16. The system as set forth in claim 14, wherein:
said at least one toaster appliance comprises a plurality of toaster appliances;
wherein said bun rotator assembly is mounted upon a longitudinally extending actuator system for permitting said plurality of bun rotators to be individually aligned with said chute mechanism so as to respectively receive heel, intermediate club, and crown segments of the bun from said chute mechanism, and to deliver the heel, intermediate club, and crown segments of the bun to predetermined slot regions formed within one of said plurality of toaster appliance; and
wherein said bun rotator assembly is also mounted upon a transversely oriented actuator system whereby said bun rotator assembly can be moved between said plurality of toaster appliances.

17. The system as set forth in claim 1, wherein:
said at least one toaster mechanism comprises a gate mechanism disposed within a bottom portion of said at least one toaster mechanism for releasing toasted segments of a bun onto a conveyor system.

18. The system as set forth in claim 17, wherein:
said conveyor system conveying toasted bun segments from said at least one toaster appliance to a toasted bun pickup station.

19. The system as set forth in claim 18, wherein:
said toasted bun pickup station comprises a toasted bun pickup mechanism for picking up toasted bun segments previously conveyed by said conveyor system from said at least one toaster appliance to said toasted bun pickup station.

20. The system as set forth in claim 19, wherein:
said toasted bun pickup mechanism comprises a plurality of needles which are adapted to be inserted into a toasted side of a heel, intermediate club, and crown segment of a bun.

21. The system as set forth in claim 20, further comprising:
a framework upon which said plurality of needles are fixedly mounted;
a discharge plate movably mounted upon said framework and through which said plurality of needles pass;
a first actuator operatively connected to said framework for moving said framework so as to insert said plurality of needles into a toasted bun segment; and
a second actuator operatively connected to said discharge plate so as to forcibly remove the toasted bun segment from said plurality of needles.

22. The system as set forth in claim 1, further comprising:
a programmable logic controller (PLC) operatively connected from a point-of-sale location to said system so as to control all movable components of said system such that said system produces toasted buns in compliance with an order inputted into said system from said point-of-sale location.

* * * * *